US012424748B2

(12) United States Patent
Celik

(10) Patent No.: US 12,424,748 B2
(45) Date of Patent: Sep. 23, 2025

(54) FILTERED DUAL-BAND PATCH ANTENNA

(71) Applicant: Trimble Inc., Sunnyvale, CA (US)

(72) Inventor: Nuri Celik, Milpitas, CA (US)

(73) Assignee: Trimble Inc., Westminster, CO (US)

( * ) Notice: Subject to any disclaimer, the term of this patent is extended or adjusted under 35 U.S.C. 154(b) by 328 days.

(21) Appl. No.: 17/109,043

(22) Filed: Dec. 1, 2020

(65) Prior Publication Data

US 2022/0173512 A1 Jun. 2, 2022

(51) Int. Cl.

| | |
|---|---|
| ***H01Q 5/321*** | (2015.01) |
| ***H01Q 1/48*** | (2006.01) |
| ***H01Q 5/314*** | (2015.01) |
| ***H01Q 5/378*** | (2015.01) |
| ***H01Q 9/04*** | (2006.01) |
| ***H01Q 19/00*** | (2006.01) |

(52) U.S. Cl.

CPC ............... *H01Q 5/321* (2015.01); *H01Q 1/48* (2013.01); *H01Q 5/314* (2015.01); *H01Q 5/378* (2015.01); *H01Q 9/045* (2013.01); *H01Q 9/0464* (2013.01); *H01Q 19/005* (2013.01)

(58) Field of Classification Search

CPC .......... H01Q 5/321; H01Q 1/48; H01Q 5/314; H01Q 5/378; H01Q 9/045; H01Q 9/0464; H01Q 19/005

See application file for complete search history.

(56) References Cited

U.S. PATENT DOCUMENTS

| | | | |
|---|---|---|---|
| 7,436,363 B1 | 10/2008 | Klein et al. | |
| 9,590,314 B2 | 3/2017 | Celik | |
| 10,181,646 B2 | 1/2019 | Celik | |
| 10,505,279 B2 | 12/2019 | Celik | |
| 2006/0103576 A1* | 5/2006 | Mahmoud | H01Q 1/28 343/700 MS |

(Continued)

FOREIGN PATENT DOCUMENTS

| | | |
|---|---|---|
| CN | 101789538 A * | 7/2010 |
| JP | 2008-177888 A | 7/2008 |

(Continued)

OTHER PUBLICATIONS

Extended European Search Report for Application No. 21209194.6-1205, mailed Apr. 12, 2022, 8 pages.

(Continued)

*Primary Examiner* — Dameon E Levi
*Assistant Examiner* — Yonchan J Kim
(74) *Attorney, Agent, or Firm* — Kilpatrick Townsend & Stockton LLP

(57) ABSTRACT

A dual-band patch antenna is described. The antenna includes a ground plane. The antenna also includes an inner conductor disposed above the ground plane. The inner conductor forms a high-frequency patch for receiving radio waves at an upper frequency band. The antenna further includes an outer conductor surrounding the inner conductor. The outer conductor and the inner conductor collectively form a low-frequency patch for receiving radio waves at a lower frequency band. The antenna further includes a filter disposed between the inner conductor and the outer conductor. The filter is configured to at least partially block electrical signals at the upper GNSS frequency band and to let pass electrical signals at the lower GNSS frequency band.

20 Claims, 16 Drawing Sheets

(56) References Cited

U.S. PATENT DOCUMENTS

| | | | | |
|---|---|---|---|---|
| 2007/0085741 | A1 | 4/2007 | Rafi et al. | |
| 2013/0342409 | A1* | 12/2013 | Tatarnikov | H01Q 9/0414 343/729 |
| 2015/0123869 | A1 | 5/2015 | Bit-Babik et al. | |
| 2016/0190704 | A1 | 6/2016 | Celik | |
| 2017/0093042 | A1* | 3/2017 | Mcmichael | H01Q 9/0428 |
| 2019/0229421 | A1* | 7/2019 | Onaka | H01Q 9/06 |

FOREIGN PATENT DOCUMENTS

| | | | |
|---|---|---|---|
| WO | 2015/159505 | A1 | 10/2015 |
| WO | 2016/109403 | A1 | 7/2016 |

OTHER PUBLICATIONS

Extended European Search Report for Application No. 21191766.1-1205, dated Nov. 24, 2021, 12 pages.

Boyko, S. N. et al., "EBG Metamaterial Ground Plane Application for GNSS Antenna Multipath Mitigating," The 2015 International Workshop on Antenna Technology (IWAT), IEEE, Mar. 4, 2015, pp. 178-181.

Ruvio, G. et al., "Radial EBG Cell Layout for GPS Patch Antennas," *Electronics Letters*, vol. 45, No. 3, Jun. 18, 2009, 2 pages.

Tanabe, M. et a., "A Bent-Ends Spiral Antenna Above a Fan-Shaped Electromagnetic Band-Gap Structure," 2015 $9^{th}$ European Conference on Antennas and Propagation (EUCAP), EURAAP, Apr. 13, 2015, 4 pages.

* cited by examiner

FILTERED DUAL-BAND PATCH ANTENNA

BACKGROUND OF THE INVENTION

A conventional stacked patch antenna may include two separate antennas, an upper patch antenna and a lower patch antenna, which are substantially flat antennas stacked on top of each other and separated vertically. The upper antenna is generally smaller in size and is configured to receive and/or transmit radio waves at higher frequencies than the lower antenna, which is generally larger in size. The two antennas may have separate feeds and are able to operate independently from each other if there is enough separation between the two antennas' frequency ranges. For example, the two antennas may be configured to operate within two separate frequency ranges for applications in which it is desirable that a single antenna structure be used to cover two separate frequency ranges simultaneously.

Such a stacked patch antenna has an increased height compared to many antenna designs, as well as a higher cost due to the amount of high-quality conductive and dielectric materials used. More importantly, due to the limited available vertical space being divided between the two antennas, the bandwidth of the conventional stacked patch antenna is lower than what is desired in many applications, such as the reception of satellite signals for providing three dimensional (3D) positioning. As such, new antenna designs and methods for their operation are needed to enable compact and low-cost device design.

BRIEF SUMMARY OF THE INVENTION

Embodiments described herein relate broadly to antennas that can operate in two separate frequency bands with high efficiency. Specifically, embodiments provide dual-band patch antennas with high-frequency and low-frequency patches that are combined and overlaid on the same plane, allowing the patches to utilize all the available vertical space instead of only a smaller portion thereof, thereby improving performance. In an embodiment, for example, an inner conductor may form a high-frequency patch and an outer conductor that is separated from the inner conductor by a filter may, in combination with the inner conductor, form a low-frequency patch. As such, the high-frequency patch and the low-frequency patch may effectively share the inner conductor.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is an antenna configured to receive radio waves at global navigation satellite system (GNSS) frequencies, the antenna comprising: a ground plane; an inner conductor disposed above the ground plane, the inner conductor forming a high-frequency patch for receiving radio waves at an upper GNSS frequency band; an outer conductor surrounding the inner conductor, the outer conductor and the inner conductor collectively forming a low-frequency patch for receiving radio waves at a lower GNSS frequency band; a filter disposed between the inner conductor and the outer conductor, the filter being configured to at least partially block electrical signals at the upper GNSS frequency band and to let pass electrical signals at the lower GNSS frequency band; and one or more feeds connected to the inner conductor for carrying the radio waves at the upper GNSS frequency band received by the high-frequency patch and the radio waves at the lower GNSS frequency band received by the low-frequency patch.

Example 2 is the antenna of example(s) 1, further comprising a dielectric layer sandwiched between the ground plane and the inner conductor.

Example 3 is the antenna of example(s) 2, wherein the one or more feeds extend through the dielectric layer and are connected to the inner conductor at a bottom side of the inner conductor.

Example 4 is the antenna of example(s) 1, wherein a magnitude of an impedance of the filter is greater between the lower GNSS frequency band and the upper GNSS frequency band than the magnitude of the impedance of the filter at each of the lower GNSS frequency band and the upper GNSS frequency band.

Example 5 is the antenna of example(s) 4, wherein the magnitude of the impedance of the filter is less than a maximum impedance threshold at each of the lower GNSS frequency band and the upper GNSS frequency band.

Example 6 is the antenna of example(s) 1, wherein an impedance of the filter is more inductive than capacitive at the lower GNSS frequency band and more capacitive than inductive at the upper GNSS frequency band.

Example 7 is the antenna of example(s) 1, wherein the filter includes at least one capacitive element and at least one inductive element.

Example 8 is the antenna of example(s) 7, wherein the at least one capacitive element and the at least one inductive element are arranged in a parallel circuit.

Example 9 is the antenna of example(s) 8, wherein the parallel circuit has a resonant frequency that is determined by a capacitance value of the at least one capacitive element and an inductance value of the at least one inductive element, and wherein the capacitance value and the inductance value are selected such that the resonant frequency of the parallel circuit is between the lower GNSS frequency band and the upper GNSS frequency band.

Example 10 is the antenna of example(s) 1, wherein each of the inner conductor and the outer conductor is circular.

Example 11 is the antenna of example(s) 1, wherein each of the inner conductor and the outer conductor is rectangular.

Example 12 is the antenna of example(s) 1, wherein the inner conductor and the outer conductor are coplanar.

Example 13 is an antenna, comprising: a ground plane; an inner conductor disposed above the ground plane, the inner conductor forming a high-frequency patch for receiving radio waves at an upper frequency band; an outer conductor surrounding the inner conductor, the outer conductor and the inner conductor collectively forming a low-frequency patch for receiving radio waves at a lower frequency band; a filter disposed between the inner conductor and the outer conductor, the filter including at least one capacitive element and at least one inductive element; and one or more feeds connected to the inner conductor for carrying electrical signals received by the high-frequency patch and electrical signals received by the low-frequency patch.

Example 14 is the antenna of example(s) 13, further comprising a dielectric layer sandwiched between the ground plane and the inner conductor.

Example 15 is the antenna of example(s) 14, wherein the one or more feeds extend through the dielectric layer and are connected to the inner conductor at a bottom side of the inner conductor.

Example 16 is the antenna of example(s) 13, wherein a magnitude of an impedance of the filter is greater between the lower frequency band and the upper frequency band than the magnitude of the impedance of the filter at each of the lower frequency band and the upper frequency band.

Example 17 is the antenna of example(s) 13, wherein the at least one capacitive element and the at least one inductive element are arranged in a parallel circuit.

Example 18 is the antenna of example(s) 17, wherein the parallel circuit has a resonant frequency that is determined by a capacitance value of the at least one capacitive element and an inductance value of the at least one inductive element, and wherein the capacitance value and the inductance value are selected such that the resonant frequency of the parallel circuit is between the lower frequency band and the upper frequency band.

Example 19 is the antenna of example(s) 13, wherein the inner conductor and the outer conductor are coplanar.

Example 20 is a method of receiving radio waves by an antenna, the method comprising: receiving, by a high-frequency patch of the antenna, radio waves at an upper frequency band, wherein the high-frequency patch is formed by an inner conductor; receiving, by a low-frequency patch of the antenna, radio waves at a lower frequency band, wherein the low-frequency patch is formed by the inner conductor and an outer conductor surrounding the inner conductor, wherein a filter is disposed between the inner conductor and the outer conductor, the filter being configured to at least partially block electrical signals at the upper frequency band and to let pass electrical signals at the lower frequency band; and carrying, using one or more feeds connected to the inner conductor, the radio waves at the upper frequency band received by the high-frequency patch and the radio waves at the lower frequency band received by the low-frequency patch.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1A:
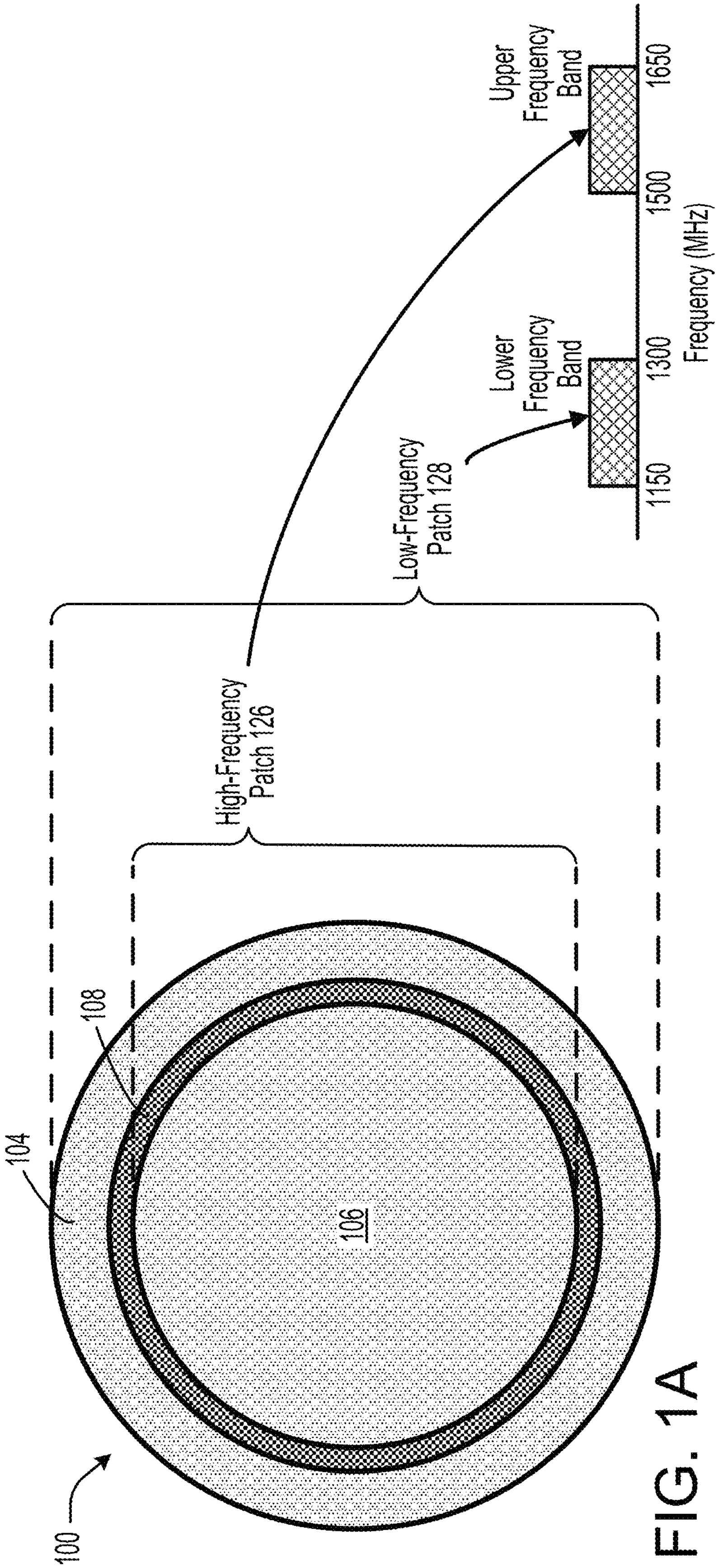
FIG. 1A illustrates a simplified top view of a portion of a dual-band coplanar patch antenna.
Figure 1B:
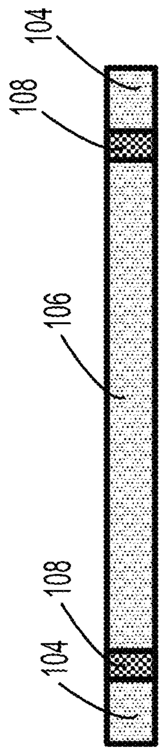
FIG. 1B illustrates a simplified cross section of a portion of a dual-band coplanar patch antenna.

FIGS. 1A and 1B illustrate a simplified top view and cross section, respectively, of a portion of a dual-band coplanar patch antenna 100, in accordance with some embodiments of the present invention. Antenna 100 includes an inner conductor 106, an outer conductor 104, and a filter 108. Inner conductor 106 may be a circular- or rectangular-shaped material that is substantially flat. Inner conductor 106 may comprise a conductive material, such as copper, and may overlay and be disposed above a dielectric layer and a ground plane (not shown). Inner conductor 106 may form a high-frequency patch 126 (or high-frequency patch antenna) that is configured to operate within a band of frequencies referred to herein as an upper frequency band. In one example, the upper frequency band may include frequencies between 1500 MHz and 1650 MHz.

Outer conductor 104 may surround inner conductor 106 and may be electrically coupled to inner conductor 106 via filter 108. Outer conductor 104 may be a circular- or rectangular ring-shaped material that is substantially flat and substantially coplanar with inner conductor 106. Outer conductor 104 may comprise a conductive material, such as copper, and may overlay and be disposed above the dielectric layer and the ground plane. Outer conductor 104 and inner conductor 106 may collectively form a low-frequency patch 128 (or low-frequency patch antenna) that is configured to operate within a band of frequencies referred to herein as a lower frequency band. The lower frequency band may be non-overlapping and lower than the upper frequency band. In one example, the lower frequency band may include frequencies between 1150 MHz and 1300 MHz.

Filter 108 may be disposed between inner conductor 106 and outer conductor 104 and may be electrically coupled to each. Filter 108 may partially or completely block electrical signals in the upper frequency band from moving between inner conductor 106 and outer conductor 104 via filter 108. For example, when antenna 100 is transmitting radio waves, filter 108 may partially or completely block electrical signals in the upper frequency band from moving from inner conductor 106 to outer conductor 104 via filter 108. As another example, when antenna 100 is receiving radio waves, filter 108 may partially or completely block electrical signals in the upper frequency band from moving from outer conductor 104 to inner conductor 106 or from inner conductor 106 to outer conductor 104 via filter 108. In contrast, during transmission or reception of radio waves, electrical signals in the lower frequency band may move freely between inner conductor 106 and outer conductor 104 via filter 108.

In some cases, filter 108 may provide a frequency-dependent impedance between inner conductor 106 and outer conductor 104. The impedance of filter 108 may be significantly more inductive than capacitive in the lower frequency band and significantly more capacitive than inductive in the upper frequency band. In some cases, the magnitude of the impedance of filter 108 may be less than a threshold in each of the lower and upper frequency bands so as to prevent standing wave behavior in those bands. In some embodiments, filter 108 may include one or more capacitive elements and/or one or more inductive elements that provide the frequency-dependent impedance of filter 108. For example, filter 108 may include multiple filter elements that each include a capacitor and an inductor arranged in a parallel circuit. The resonant frequency of each parallel circuit may be tuned (e.g., by adjusting capacitance and/or inductance values) to provide the desired impedance at the lower and upper frequency bands.

In some embodiments, lower and upper frequency bands may correspond to two frequency bands where most global navigation satellite system (GNSS) frequencies can be transmitted and received. A GNSS uses medium Earth orbit (MEO) satellites to provide geospatial positioning of receiving devices. Typically, wireless signals transmitted from such satellites can be used by GNSS receivers to determine their position, velocity, and time. Examples of currently operational GNSSs include the United States' Global Positioning System (GPS), Russia's Global Navigation Satellite System (GLONASS), China's BeiDou Satellite Navigation System, the European Union's (EU) Galileo, Japan's Quasi-Zenith Satellite System (QZSS), and the Indian Regional Navigation Satellite System (IRNSS). Many of the frequencies of the above-listed GNSSs may lie within one or both of the lower and upper frequency bands. For example, GPS satellites may broadcast L1 signals at 1.57542 GHz (in the upper frequency band) and L2 signals at 1.2276 GHz (in the lower frequency band).

Figure 2A:
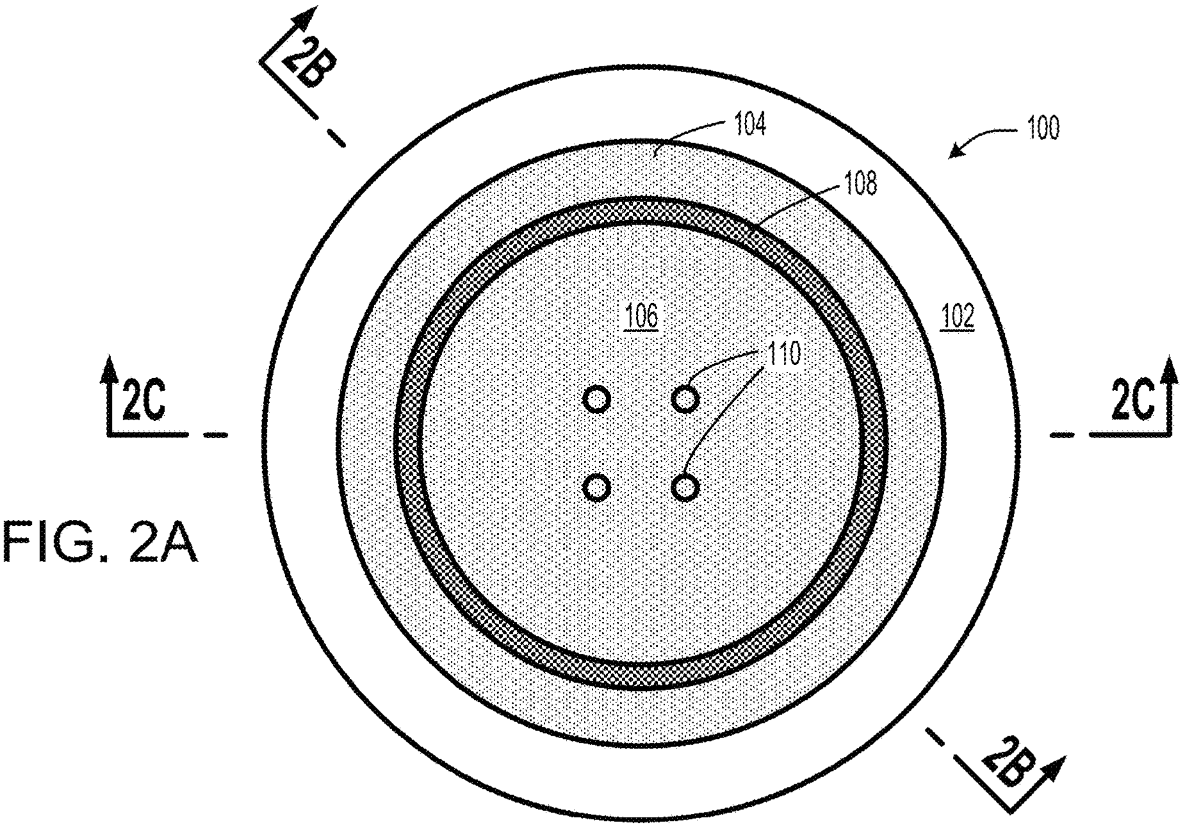
FIG. 2A illustrate a simplified top view of a dual-band coplanar patch antenna.
Figure 2B:
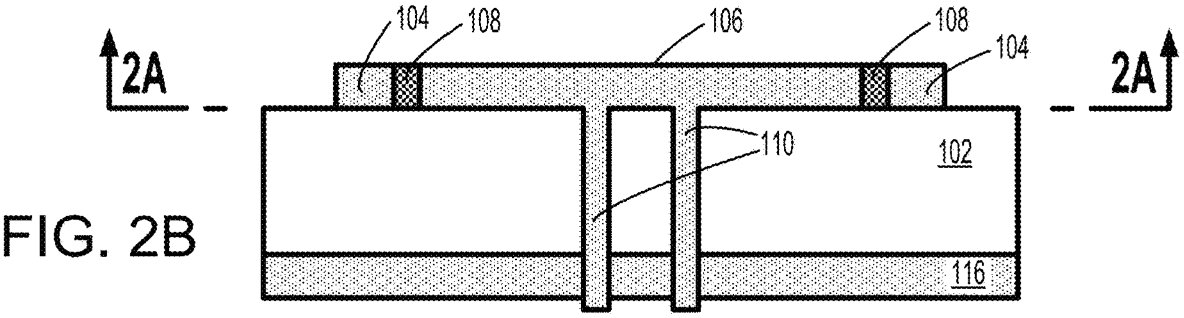
FIG. 2B illustrates a simplified cross section of a dual-band coplanar patch antenna.
Figure 2C:
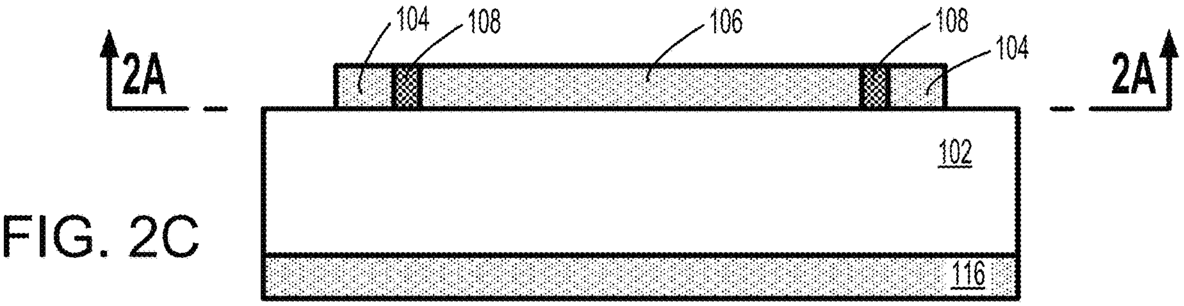
FIG. 2C illustrates a simplified cross section of a dual-band coplanar patch antenna.

FIGS. 2A, 2B, and 2C illustrate a simplified top view, first cross section, and second cross section, respectively, of dual-band coplanar patch antenna 100, in accordance with some embodiments of the present invention. As described in reference to FIGS. 1A and 1B, antenna 100 includes inner conductor 106, outer conductor 104, and filter 108. Each of inner conductor 106 and outer conductor 104 may overlay a dielectric layer 102. In some embodiments, dielectric layer 102 may comprise a non-conductive material such as a plastic, ceramic, or air, while inner conductor 106, outer conductor 104, and portions of filter 108 may comprise a conductive material such as a metal or alloy. In some embodiments, the dielectric material may include a non-conductive laminate or pre-preg, such as those commonly used for printed circuit board (PCB) substrates (e.g., FR4), and inner conductor 106, outer conductor 104, and/or portions of filter 108 may be etched from a metal foil in accordance with known PCB processing techniques.

In some embodiments, the dimensions of inner conductor 106 and outer conductor 104, such as their diameters, widths, heights, etc., may be determined based on their desired radiation patterns, operating frequencies, and/or bandwidths. In some embodiments, dielectric layer 102 is substantially the same shape as outer conductor 104 and has a diameter that is greater than an outside diameter of outer conductor 104. Inner conductor 106, outer conductor 104, and/or dielectric layer 102 may be substantially planar in some embodiments or may have a slight curvature in other embodiments. The slight curvature can improve low elevation angle sensitivity.

Antenna 100 may include one or more feed(s) 110 that are connected to inner conductor 106 at a bottom side or surface of inner conductor 106. Each of feed(s) 110 may extend through dielectric layer 102. While the illustrated example shows four feeds 110, other embodiments may include a different number of feeds (more or less). Feed(s) 110 provide an electrical connection between the inner conductor 106 and the remaining circuitry of the transmitter and/or receiver, such as a radio-frequency (RF) front end and/or receiver processor. Hence, feed(s) 110 provide electrical connectivity for both high-frequency patch 126 (formed by inner conductor 106) and low-frequency patch 128 (collectively formed by inner conductor 106 and outer conductor 104).

In some embodiments, feed(s) 110 may be disposed around a center of inner conductor 106 so that each feed 110 is spaced from adjacent feeds 110 by approximately equal angular intervals. The example shown in FIGS. 2A-2C includes four feeds 110, and each of feeds 110 are spaced from adjacent feeds 110 by approximately 90°. For a patch antenna with six feeds, the angular spacing would be approximately 60°; for a patch antenna with eight feeds, the angular spacing would be approximately 45°; and so on.

The placement of feeds 110 around the center of inner conductor 106 allows feeds 110 to be phased to provide circular polarization. For example, signals associated with the four feeds 110 shown in FIG. 2A may each have a phase that differs from the phase of an adjacent feed by +90° and that differs from the phase of another adjacent feed by −90°. In some embodiments, the feeds are phased in accordance with known techniques to provide right hand circular polarization (RHCP) and suppress left hand circular polarization (LHCP). The number of feeds may be determined based on a desired bandwidth of the patch antenna as well as the desired interference/multipath immunity, i.e., the LHCP suppression.

Antenna 100 may further include a ground plane 116 that is electrically grounded and electrically isolated from inner conductor 106 and outer conductor 104. Ground plane 116 may be coupled to a bottom surface of dielectric layer 102 and may have a similar shape. In some embodiments, feed(s) 110 may be coaxial cables whose inner conductors are electrically connected to inner conductor 106 and whose concentric conducting shields are electrically connected to ground plane 116.

Dielectric layer 102 may be sandwiched between ground plane 116 and inner conductor 106, filter 108, and outer conductor 104. Dielectric layer 102 may include a single layer or multiple layers. In some implementations, dielectric layer 102 may be made up of an FR4 material, as described above. For example, antenna 100 may be fabricated using a double-sided PCB structure consisting of a FR4 core sandwiched between top and bottom copper layers. Each of inner conductor 106, filter 108, and outer conductor 104 may be formed by etching the top copper layer of the double-sided PCB structure, with the bottom copper layer serving as ground plane 116 and the FR4 core serving as dielectric layer 102. In some implementations, ground plane 116 can be etched onto another FR4 material or within an FR4 material. In some implementations, a plastic dielectric material may be sandwiched in between the two FR4 boards. In some embodiments, dielectric layer 102 may include one or more air gaps.

FIG. 2B illustrates a simplified cross section along line 2B-2B of antenna 100 shown in FIG. 2A. This figure provides a cross-section view of inner conductor 106, filter 108, outer conductor 104, feed(s) 110, dielectric layer 102, and ground plane 116. Similarly, FIG. 2C illustrates a simplified cross section along line 2C-2C of antenna 100 shown in FIG. 2A. This figure provides a cross-section view of inner conductor 106, filter 108, outer conductor 104, dielectric layer 102, and ground plane 116.

Figure 3A:
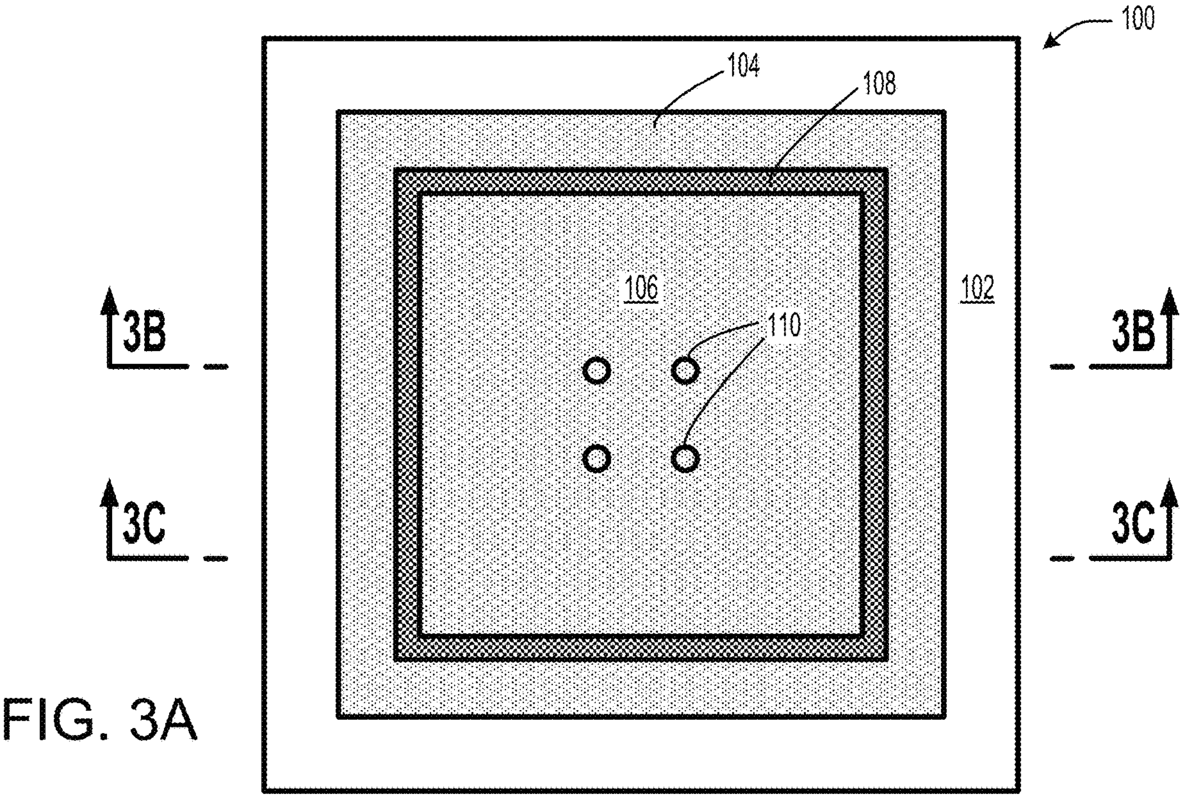
FIG. 3A illustrate a simplified top view of a dual-band coplanar patch antenna.
Figure 3B:
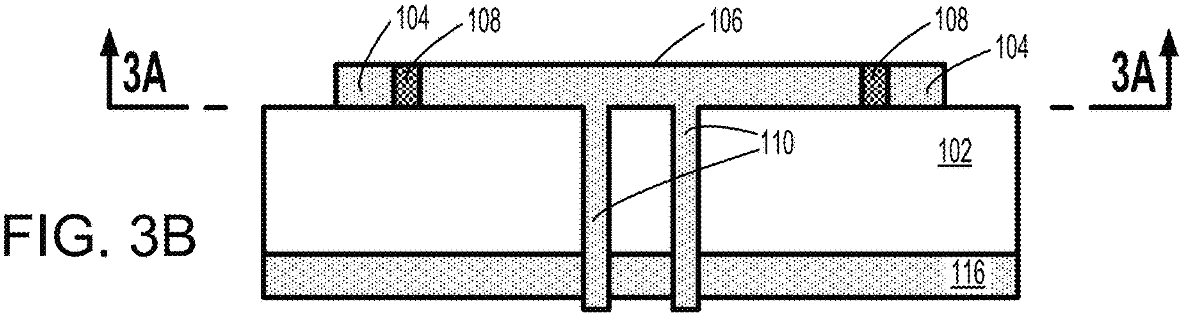
FIG. 3B illustrates a simplified cross section of a dual-band coplanar patch antenna.
Figure 3C:
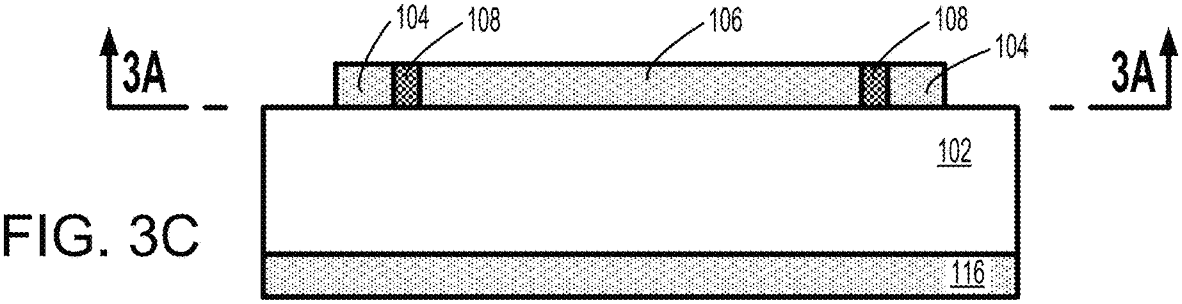
FIG. 3C illustrates a simplified cross section of a dual-band coplanar patch antenna.

FIGS. 3A, 3B, and 3C illustrate a simplified top view, first cross section, and second cross section, respectively, of dual-band coplanar patch antenna 100, in accordance with some embodiments of the present invention. Antenna 100 illustrated in FIGS. 3A-3C differs from antenna 100 illustrated in FIGS. 2A-2C in that each of inner conductor 106, filter 108, outer conductor 104, and dielectric layer 102 are rectangular. FIG. 3B illustrates a simplified cross section along line 3B-3B of antenna 100 shown in FIG. 3A, and FIG. 3C illustrates a simplified cross section along line 3C-3C of antenna 100 shown in FIG. 3A.

Figure 4:
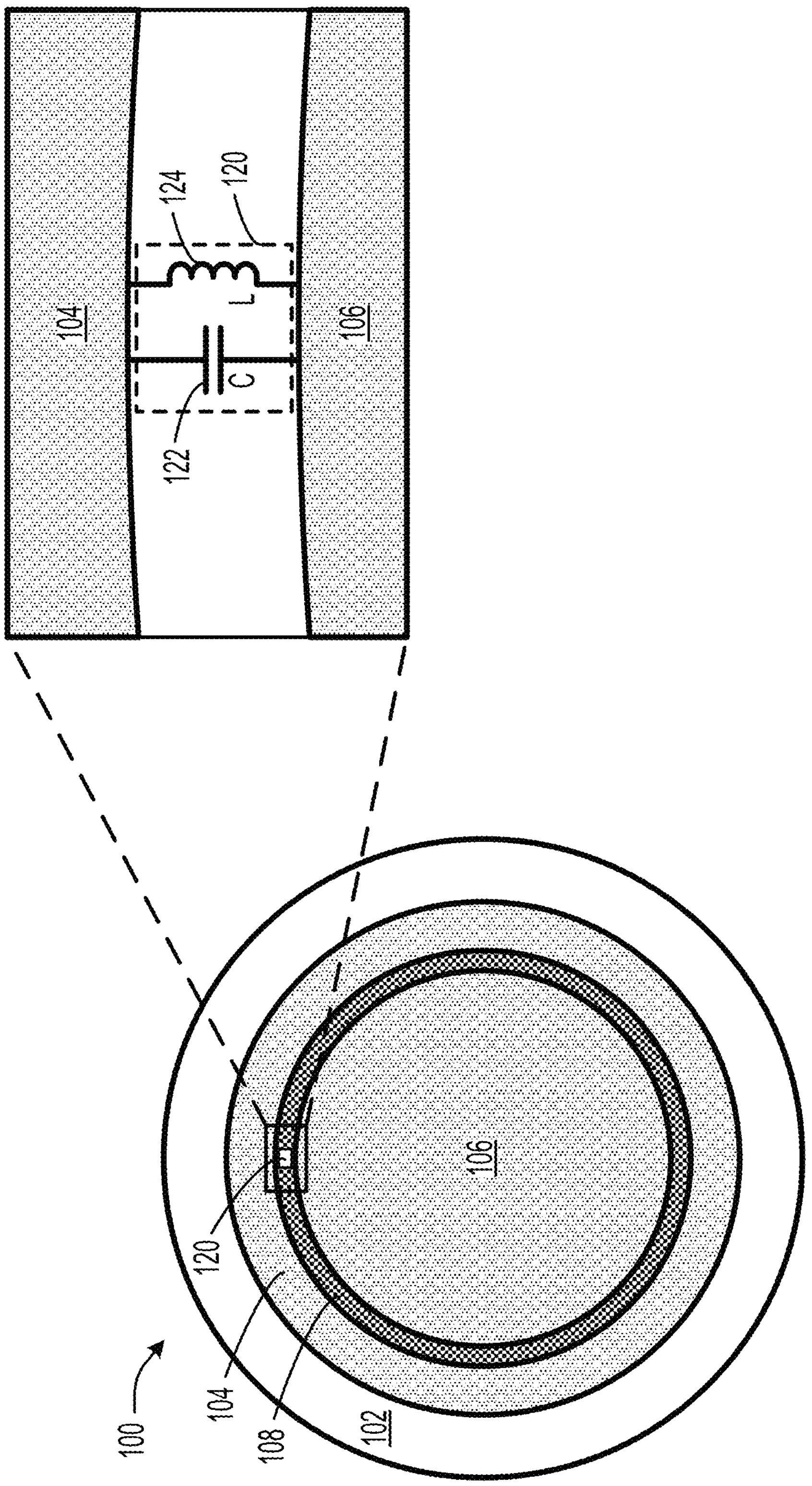
FIG. 4 illustrates a simplified top view of an antenna.

FIG. 4 illustrates a simplified top view of antenna 100, in accordance with some embodiments of the present invention. In the illustrated example, filter 108 includes a single filter element 120 that extends between and is connected to each of inner conductor 106 and outer conductor 104. Filter element 120 may include a parallel circuit comprising a capacitive element 122 (e.g., a capacitor C) with a capacitance value C and an inductive element 124 (e.g., an inductor L) with an inductance value L. The parallel circuit may alternatively be referred to as a resonant circuit or a tuned circuit. In some embodiments, the resonant frequency $f_R$ of the parallel circuit may be expressed as $f_R=1/(2\pi\sqrt{LC})$. As such, the resonant frequency $f_R$ may be adjusted by modifying the capacitance and inductance values C and L.

In various embodiments, capacitive element 122 and inductive element 124 may be lumped elements or distributed elements. For example, capacitive element 122 may be a discrete capacitor, such as a ceramic capacitor, film capacitor, or electrolytic capacitor. As another example, capacitive element 122 may be formed by spacing portions of inner conductor 106 and outer conductor 104 at a particular distance apart from each other and over a particular length of filter 108. As such, filter element 120 may be confined to a single location along filter 108 (such as at the 0° position) or may be distributed across a length of filter 108 (such as between the 0° and 90° positions, the 0° and 180° positions, the 0° and 270° positions, or along the entirety of filter 108).

Figure 5:
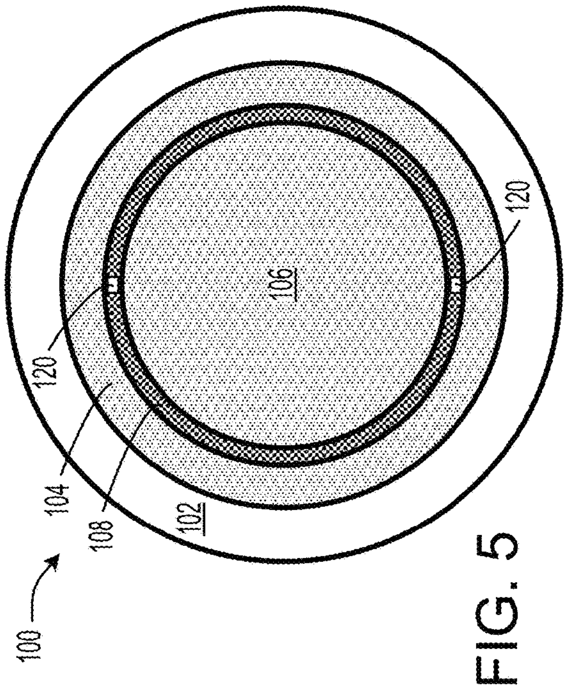
FIG. 5 illustrates a simplified top view of an antenna.

FIG. 5 illustrates a simplified top view of antenna 100, in accordance with some embodiments of the present invention. In the illustrated example, filter 108 includes two filter elements 120 that extend between inner conductor 106 and outer conductor 104. Filter elements 120 are positioned at the 0° and 180° positions of filter 108.

Figure 6:
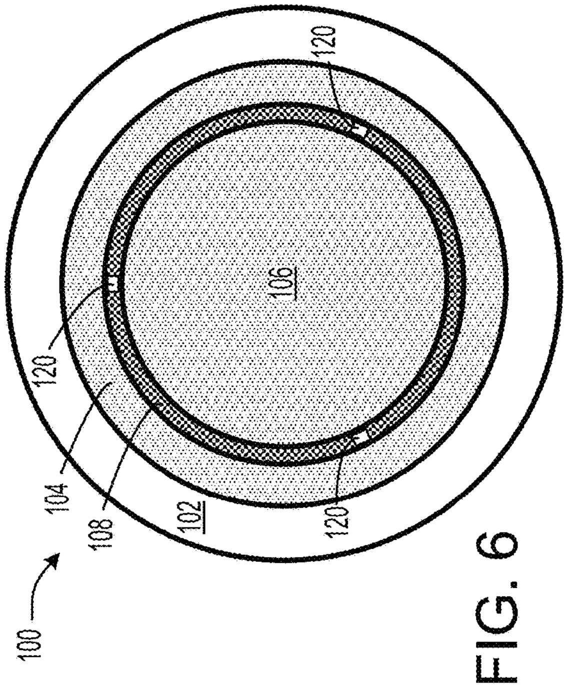
FIG. 6 illustrates a simplified top view of an antenna.

FIG. 6 illustrates a simplified top view of antenna 100, in accordance with some embodiments of the present invention. In the illustrated example, filter 108 includes three filter elements 120 that extend between inner conductor 106 and outer conductor 104. Filter elements 120 are positioned at the 0°, 120°, and 240° positions of filter 108.

Figure 7:
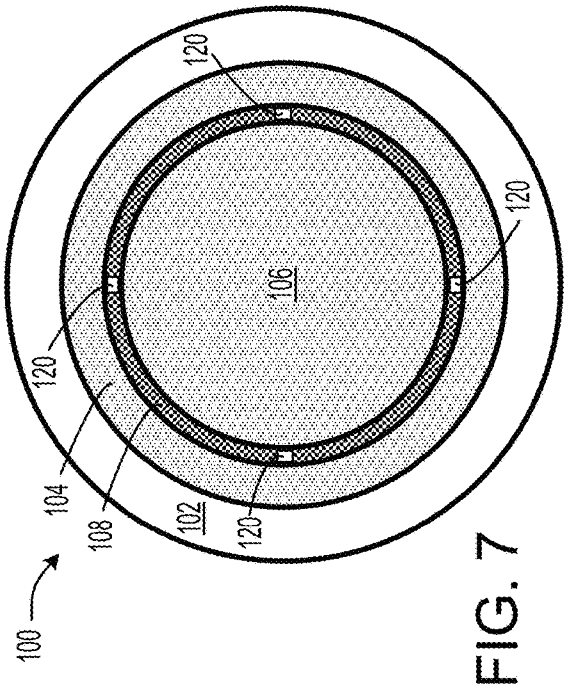
FIG. 7 illustrates a simplified top view of an antenna.

FIG. 7 illustrates a simplified top view of antenna 100, in accordance with some embodiments of the present invention. In the illustrated example, filter 108 includes four filter elements 120 that extend between inner conductor 106 and outer conductor 104. Filter elements 120 are positioned at the 0°, 90°, 180°, and 270° positions of filter 108.

Figure 8:
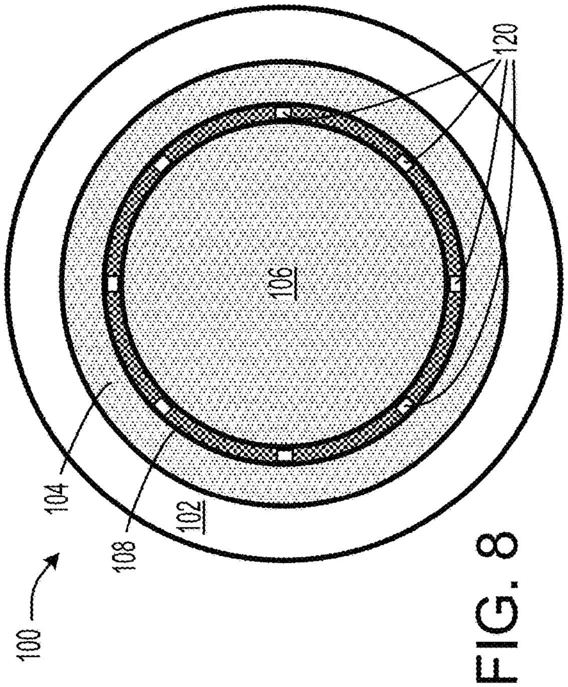
FIG. 8 illustrates a simplified top view of an antenna.

FIG. 8 illustrates a simplified top view of antenna 100, in accordance with some embodiments of the present invention. In the illustrated example, filter 108 includes eight filter elements 120 that extend between inner conductor 106 and outer conductor 104. Filter elements 120 are positioned at the 0°, 45°, 90°, 135°, 180°, 225°, 270°, and 315° positions of filter 108.

Figure 9:
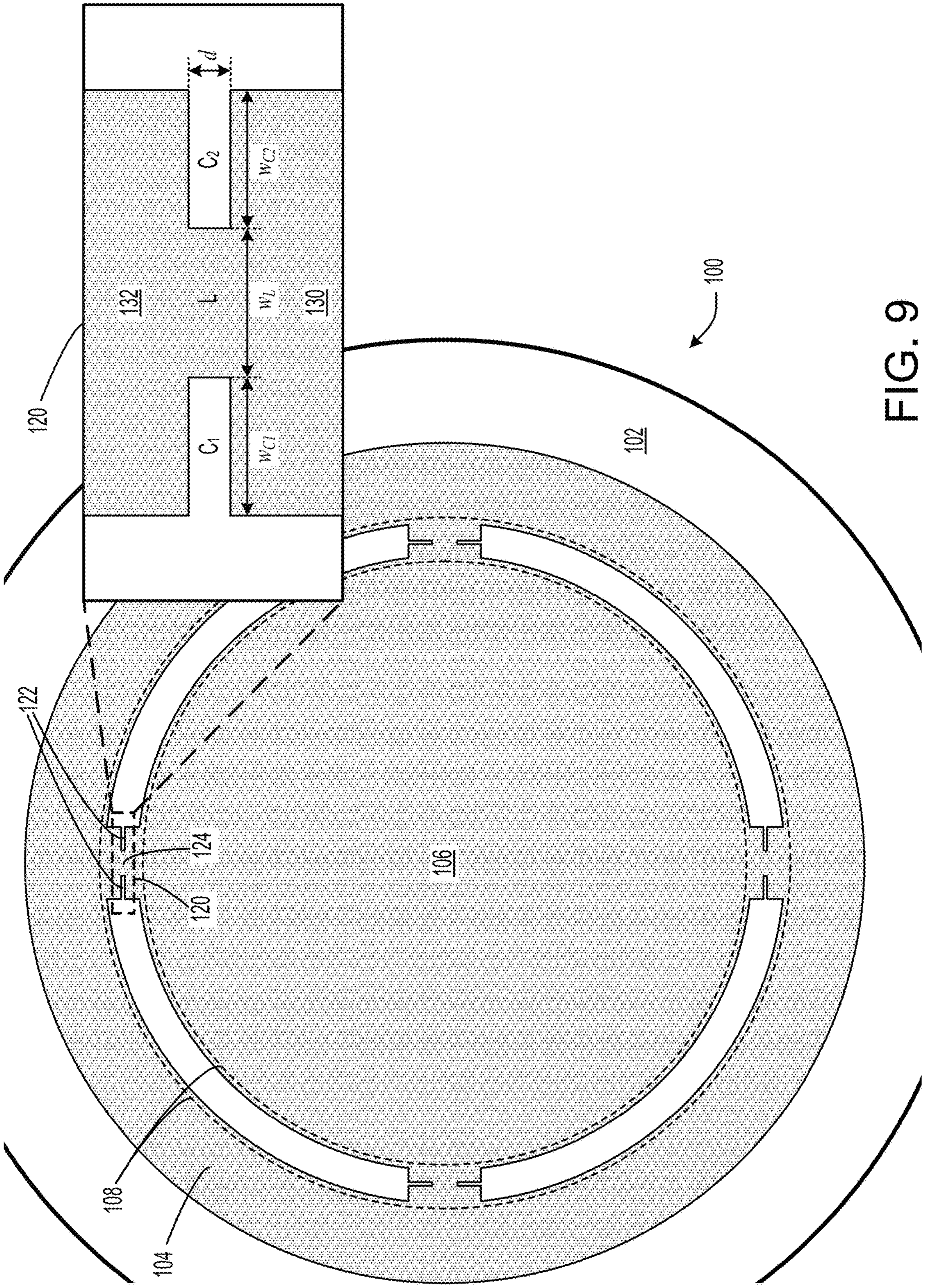
FIG. 9 illustrates a simplified top view of an antenna.

FIG. 9 illustrates a simplified top view of antenna 100, in accordance with some embodiments of the present invention. In the illustrated example, filter 108 includes four filter elements 120 that extend between inner conductor 106 and outer conductor 104. Filter elements 120 are roughly positioned at the 0°, 90°, 180°, and 270° positions of filter 108. Each of filter elements 120 includes two capacitive elements 122 (e.g., capacitors $C_1$ and $C_2$) in parallel with an inductive element 124 (e.g., inductor L). Capacitive elements 122 are formed by spacing a conductive element 130 connected to and/or integrated with inner conductor 106 and a conductive element 132 connected to and/or integrated with outer conductor 104 at a distance d apart from each other and over widths $w_{C1}$ and $w_{C2}$, corresponding to capacitors $C_1$ and $C_2$, respectively. Inductive element 124 is formed by a connection between conductive element 130 and conductive element 132 having a distance d and a width $w_L$, corresponding to inductor L.

Capacitance values $C_1$ and $C_2$ are dependent on distance d and widths $w_{C1}$ and $w_{C2}$, respectively, and inductance value L is dependent on distance d and width $w_L$. As such, the dimensions d, $w_{C1}$, $w_2$, and $w_L$, can be tuned to obtain a desired resonant frequency $f_R=1/(2\pi\sqrt{LC})$ where, in some cases, $C=C_1+C_2$ or, in some cases, C is a function of $C_1$ and $C_2$. For example, in some cases, increasing distance d may increase inductance value L and decrease capacitance values $C_1$ and $C_2$, increasing $w_{C1}$ and $w_{C2}$ may increase capacitance values $C_1$ and $C_2$, and increasing $w_L$ may decrease inductance value L.

Figure 10:
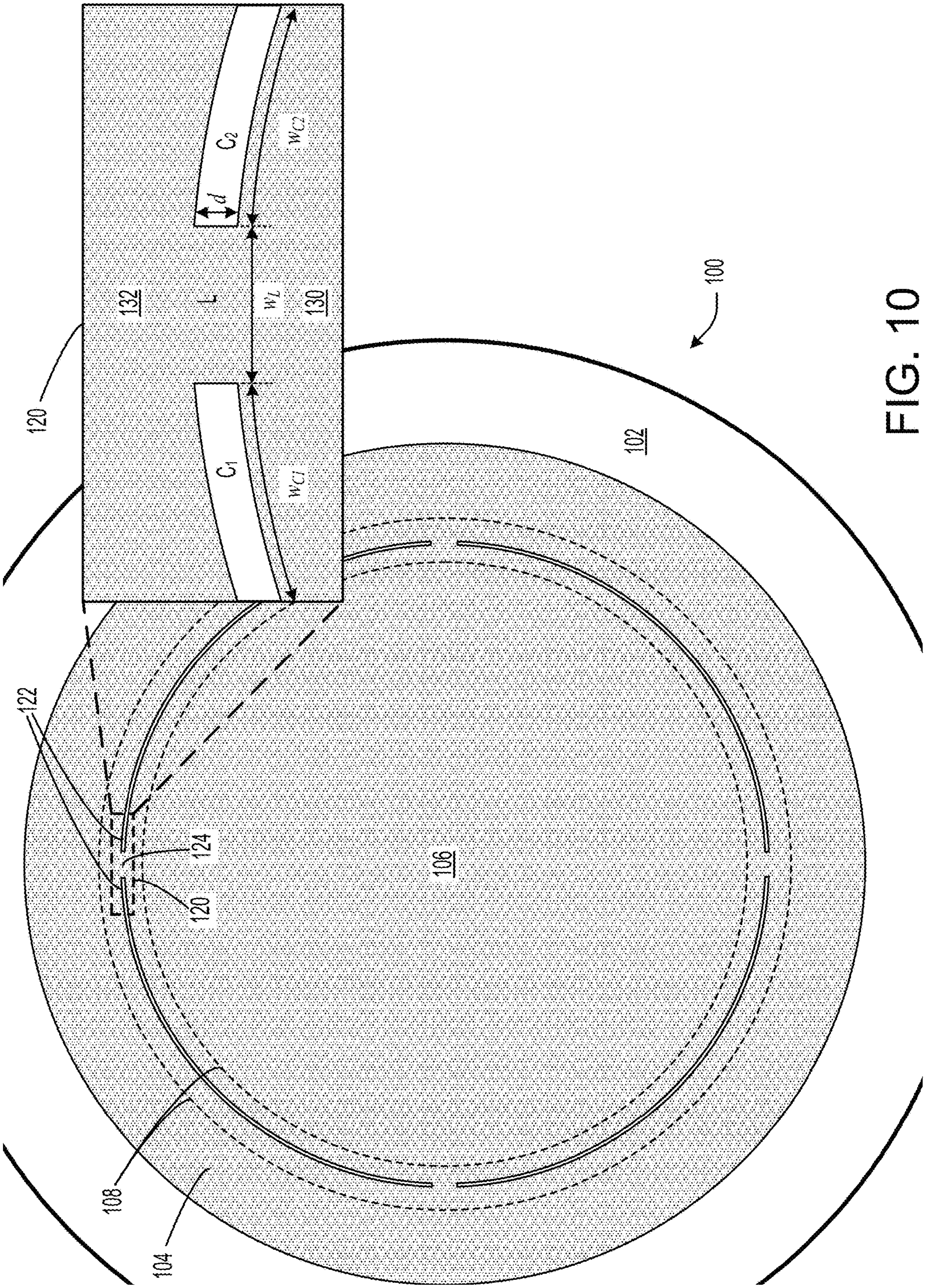
FIG. 10 illustrates a simplified top view of an antenna.

FIG. 10 illustrates a simplified top view of antenna 100, in accordance with some embodiments of the present invention. In the illustrated example, filter 108 includes multiple filter elements 120 that extend between inner conductor 106 and outer conductor 104 along the entire length of filter 108. Each filter element 120 may include two capacitive elements 122 (e.g., capacitors $C_1$ and $C_2$) in parallel with an inductive element 124 (e.g., inductor L). Alternatively, each filter element 120 may be considered to include a single capacitive element 122 (e.g., capacitor $C_1$) in parallel with an inductive element 124 (e.g., inductor L), such that filter 108 is considered to include four capacitive elements 122 and four inductive elements 124. Capacitive elements 122 are formed by spacing a conductive element 130 connected to and/or integrated with inner conductor 106 and a conductive element 132 connected to and/or integrated with outer conductor 104 at a distance d apart from each other and over widths $w_{C1}$ and $w_{C2}$, corresponding to capacitors $C_1$ and $C_2$, respectively. Inductive element 124 is formed by a connection between conductive element 130 and conductive element 132 having a distance d and a width $w_L$, corresponding to inductor L.

Similar to that described in reference to FIG. 9, capacitance values $C_1$ and $C_2$ are dependent on distance d and widths $w_{C1}$ and $w_{C2}$, respectively, and inductance value L is dependent on distance d and width $w_L$. As such, the dimensions d, $w_{C1}$, $w_{C2}$, and $w_L$ can be tuned to obtain a desired resonant frequency $f_R=1/(2\pi\sqrt{LC})$ where, in some cases, $C=C_1+C_2$ (or $C=C_1$) or, in some cases, C is a function of $C_1$ and $C_2$. For example, in some cases, increasing distance d may increase inductance value L and decrease capacitance values $C_1$ and $C_2$, increasing $w_{C1}$ and $w_{C2}$ may increase capacitance values $C_1$ and $C_2$, and increasing $w_L$ may decrease inductance value L.

Figure 11:
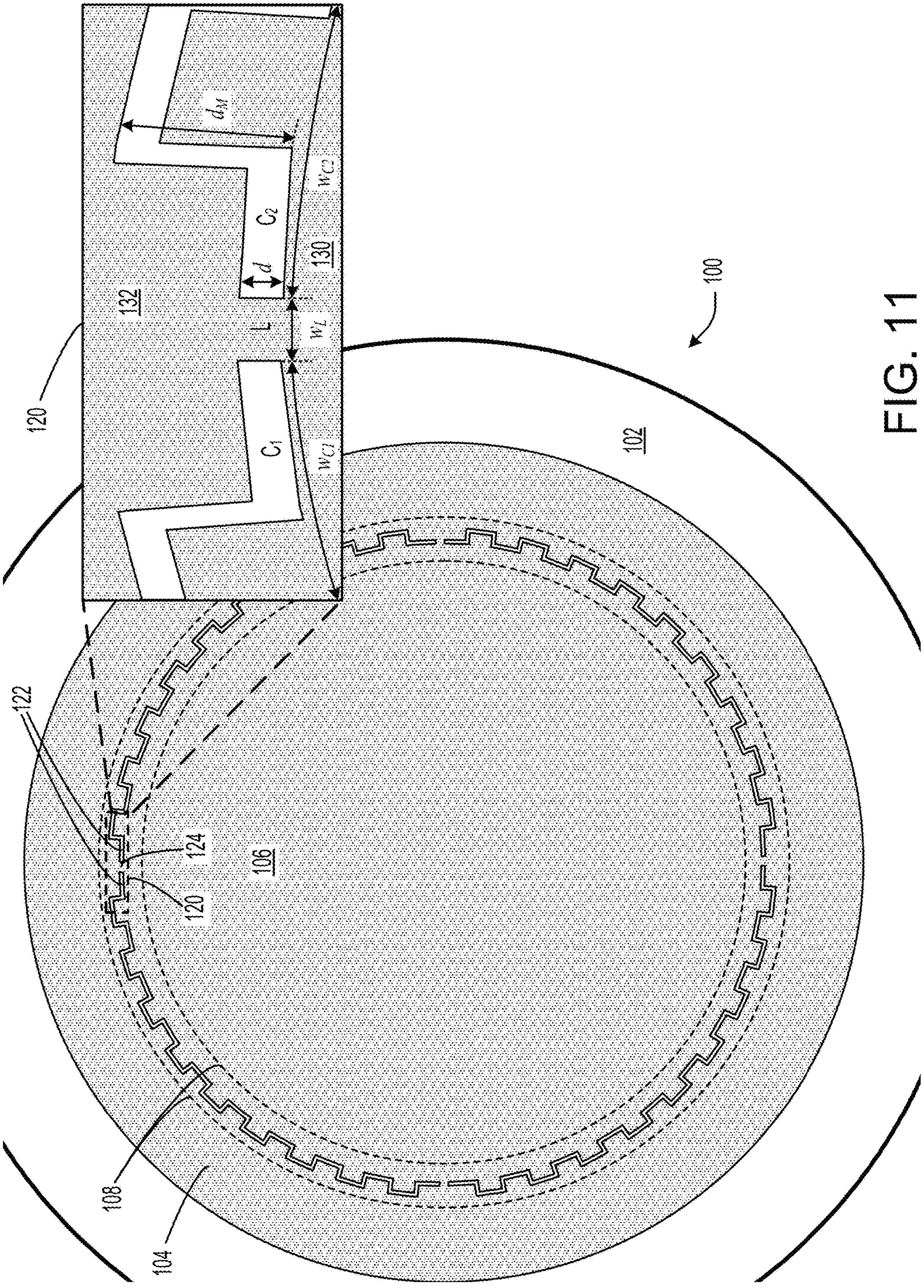
FIG. 11 illustrates a simplified top view of an antenna.

FIG. 11 illustrates a simplified top view of antenna 100, in accordance with some embodiments of the present invention. In the illustrated example, filter 108 includes multiple filter elements 120 that extend between inner conductor 106 and outer conductor 104 along the entire length of filter 108. Each filter element 120 may include two capacitive elements 122 (e.g., capacitors $C_1$ and $C_2$) in parallel with an inductive element 124 (e.g., inductor L). Alternatively, each filter element 120 may be considered to include a single capacitive element 122 (e.g., capacitor $C_1$) in parallel with an inductive element 124 (e.g., inductor L), such that filter 108 is considered to include four capacitive elements 122 and four inductive elements 124.

Antenna 100 shown in FIG. 11 differs from antenna 100 shown in FIG. 10 in that capacitive elements 122 have an increased width due to a meandering distance $d_M$ defined as the distance that the spacing between conductive elements 130 and 132 moves back and forth between inner conductor 106 and outer conductor 104. The meandering pattern shown in FIG. 11 is one example, and other meandering patterns, such as a zig-zag pattern, may similarly be employed to increase the width and accordingly the capacitance values of capacitive elements 122.

Capacitance values $C_1$ and $C_2$ are dependent on distance d, meandering distance $d_M$, widths $w_{C1}$ and $w_{C2}$, respectively, and inductance value L is dependent on distance d and width $w_L$. As such, the dimensions d, $d_M$, $w_{C1}$, $w_{C2}$, and $w_L$ can be tuned to obtain a desired resonant frequency $f_R=1/(2\pi\sqrt{LC})$ where, in some cases, $C=C_1+C_2$ (or $C=C_1$) or, in some cases, C is a function of $C_1$ and $C_2$. For example, in some cases, increasing distance d may increase inductance value L and decrease capacitance values $C_1$ and $C_2$, increasing $w_{C1}$ and $w_{C2}$ may increase capacitance values $C_1$ and $C_2$, increasing $w_L$ may decrease inductance value L, and increasing $d_M$ may increase capacitance values $C_1$ and $C_2$.

While FIG. 11 shows inductive element 124 as being positioned in the lower radius portion of the meander, in some embodiments inductive element 124 may be positioned in the higher radius portion of the meander and/or between the lower and higher radii portions of the meander along the meandering distance $d_M$.

Figure 12A:
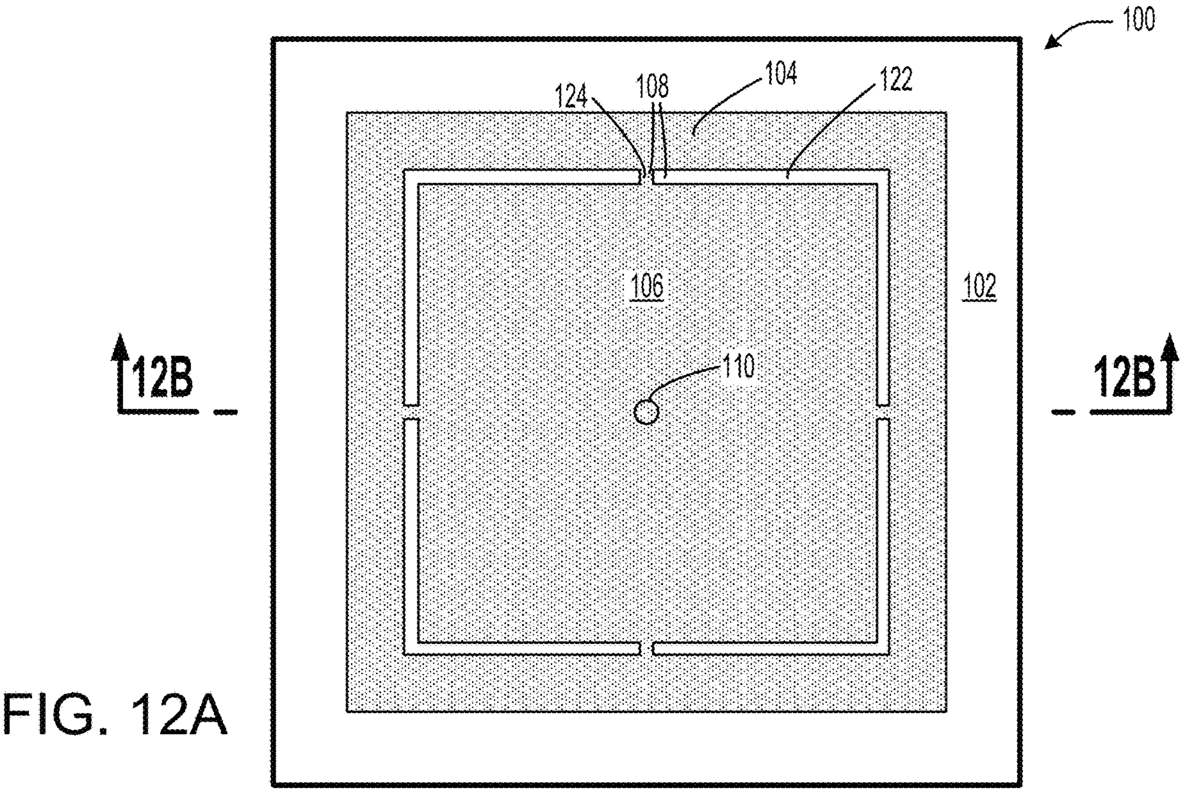
FIG. 12A illustrates a simplified top view of an antenna.
Figure 12B:
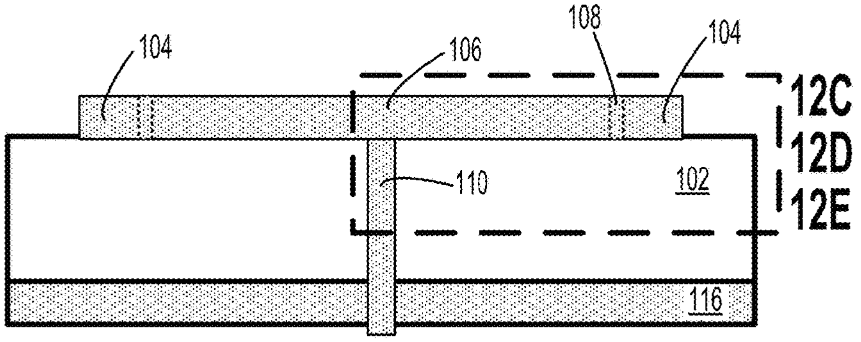
FIG. 12B illustrates a simplified cross section of an antenna.
Figure 12C:
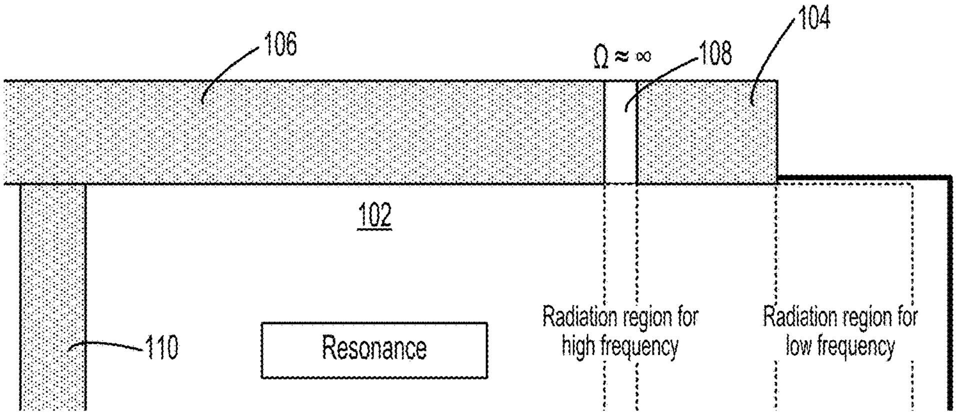
FIG. 12C illustrates a simplified zoomed in cross section of an antenna.
Figure 12D:
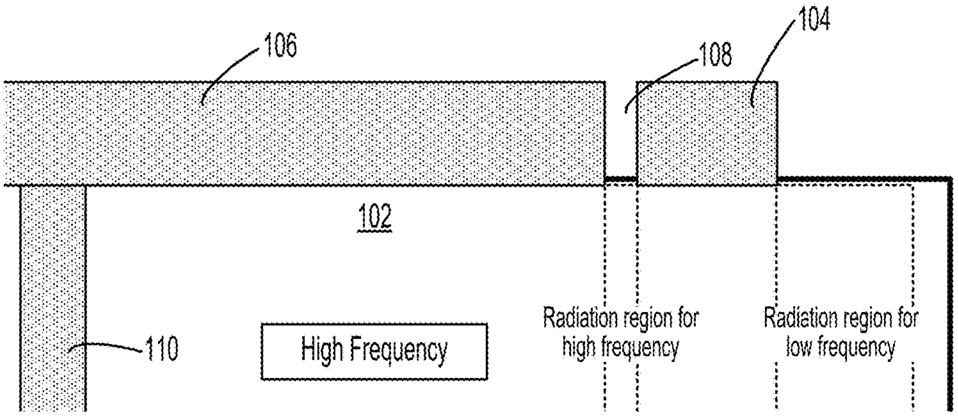
FIG. 12D illustrates a simplified zoomed in cross section of an antenna.
Figure 12E:
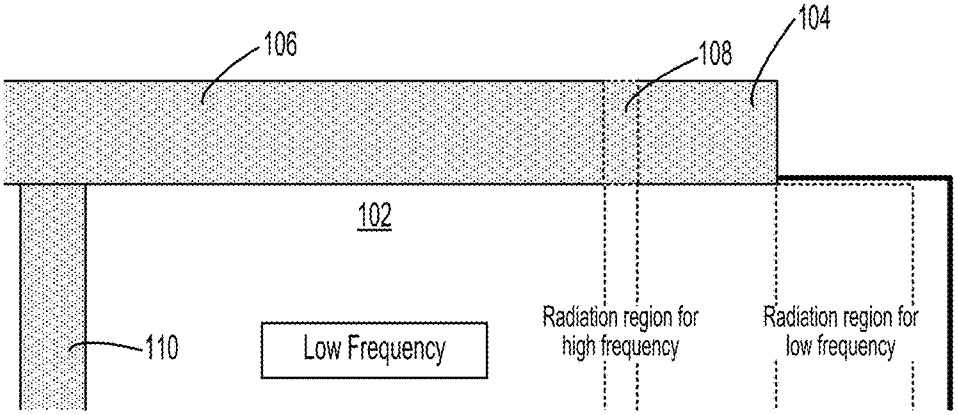
FIG. 12E illustrates a simplified zoomed in cross section of an antenna.

FIGS. 12A, 12B, 12C, 12D, and 12E illustrate a simplified top view, first cross section, second cross section, third cross section, and fourth cross section, respectively, of antenna 100, in accordance with some embodiments of the present invention. As described previously, antenna 100 includes inner conductor 106, outer conductor 104, dielectric layer 102, feed 110, filter 108 including capacitive element 122 and inductive element 124, and ground plane 116. FIG. 12B illustrates a simplified cross section along line 12B-12B of antenna 100 shown in FIG. 12A. FIGS. 12C-12E illustrate zoomed in versions of FIG. 12B and illustrate the behavior of antenna 100 and filter 108 at three different frequencies.

FIG. 12C illustrates the behavior of antenna 100 and filter 108 at the resonant frequency. The impedance of filter 108, which includes the parallel circuit including capacitive element 122 and inductive element 124, is real and is approximately infinity. For electromagnetic waves, filter 108 behaves like a wall and the electromagnetic waves propagating toward filter 108 from feed 110 are fully reflected back toward feed 110. Since the impedance is real, the result is an in phase total reflection with a standing wave and no radiation.

FIG. 12D illustrates the behavior of antenna 100 and filter 108 at the high frequency band. The impedance of filter 108 is imaginary and is more capacitive than inductive, i.e., the impedance is primarily capacitive. Electromagnetic waves propagating toward filter 108 from feed 110 choose the easiest path, which is the "gap" formed by capacitive element 122. These electromagnetic waves flow through the gap, enter the radiation region for the high-frequency band (e.g., between inner conductor 106 and outer conductor 104), and radiate around the gap.

FIG. 12E illustrates the behavior of antenna 100 and filter 108 at the low frequency band. The impedance of filter 108 is imaginary and is more inductive than capacitive, i.e., the impedance is primarily inductive. Electromagnetic waves propagating toward filter 108 from feed 110 choose the easiest path, which is the "bridge" formed by inductive element 124. These electromagnetic waves flow through the bridge, enter the radiation region for the low-frequency band (e.g., outside outer conductor 104), and radiate.

Figure 13:
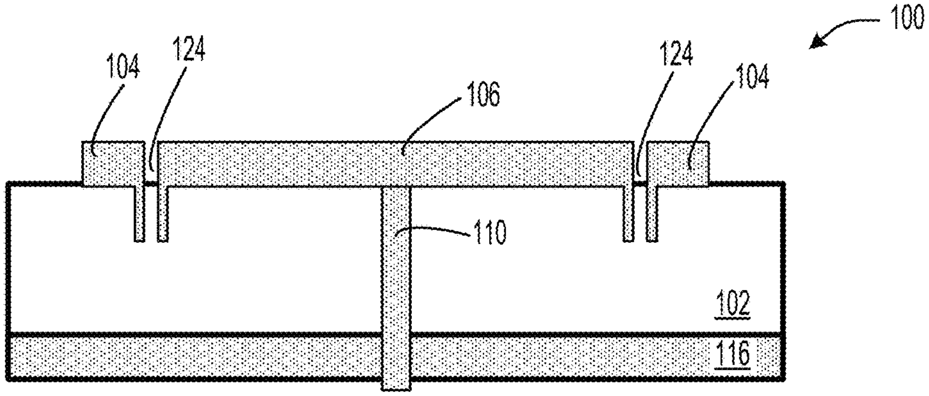
FIG. 13 illustrates a simplified cross section of an antenna having increased capacitance.

FIG. 13 illustrates a simplified cross section of antenna 100 having increased capacitance, in accordance with some embodiments of the present invention. In the illustrated example, capacitive element 124 extends vertically down into dielectric layer 102 so as to increase the capacitance by both increasing the area of the capacitor plates as well as increasing the effective dielectric constant of the material between the capacitor plates. The illustrated implementation can provide a greater range of possible resonant frequencies. In some embodiments, a three-layer circuit board can be used to extend capacitive element 124 downward into dielectric layer 102.

Figure 14:
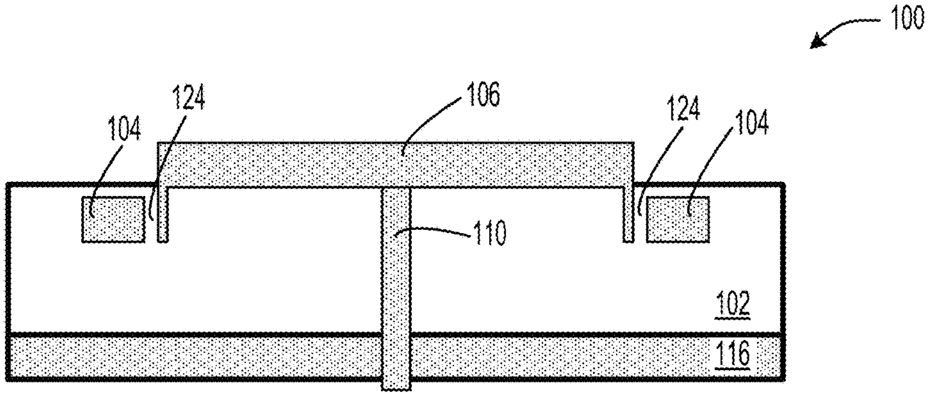
FIG. 14 illustrates a simplified cross section of an antenna having increased capacitance.

FIG. 14 illustrates a simplified cross section of antenna 100 having increased capacitance, in accordance with some embodiments of the present invention. FIG. 14 differs from FIG. 13 in that outer conductor 104 is disposed within dielectric layer 104, providing a smaller improvement in capacitance than that in FIG. 13 but with a smaller form factor. Antenna 100 in FIG. 14 may also be implemented using a three-layer circuit board.

Figure 15:
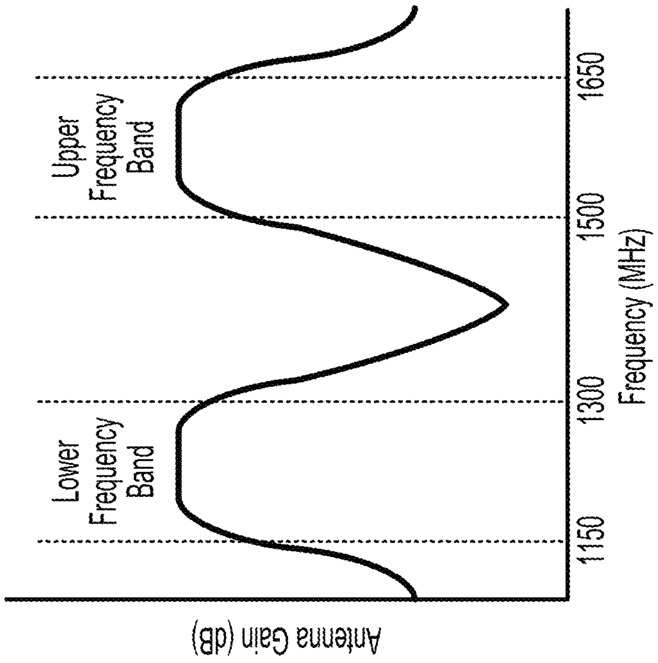
FIG. 15 illustrates a plot showing an example antenna gain as a function of frequency.

FIG. 15 illustrates a plot showing an example antenna gain of antenna 100 as a function of frequency, in accordance with some embodiments of the present invention. In the illustrated example, the antenna gain is high in each of the lower and upper frequency bands and is low outside these bands. As such, antenna 100 can be receptive to radio waves having frequencies in the lower and upper frequency bands while rejecting radio waves having frequencies outside these bands.

Figure 16A:
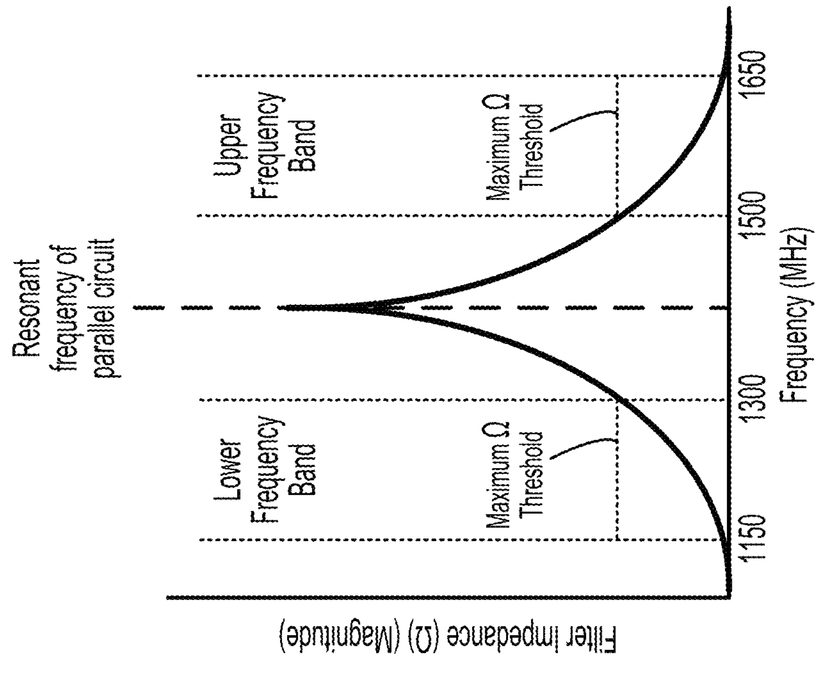
FIG. 16A illustrates a plot showing an example impedance of a filter as a function of frequency.
Figure 16B:
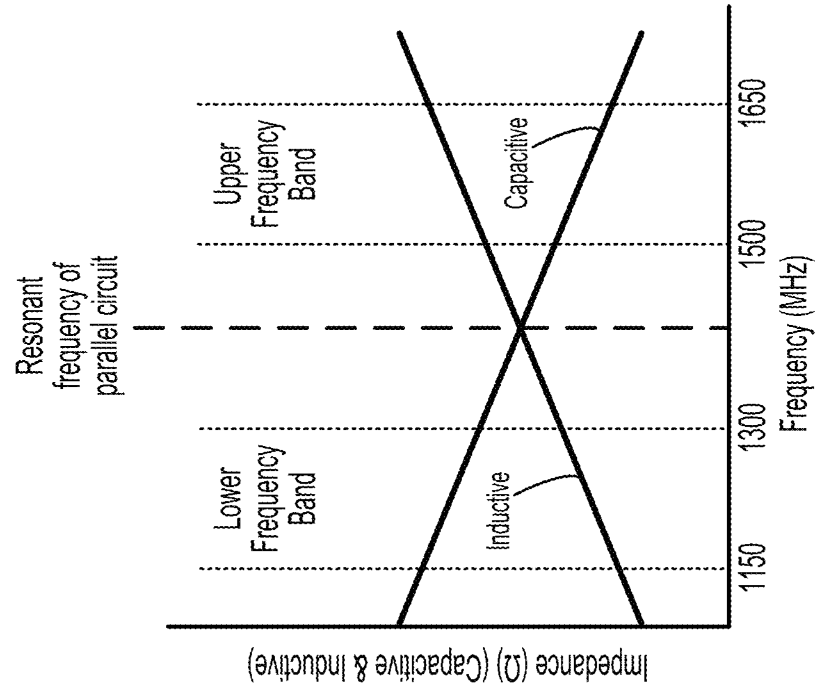
FIG. 16B illustrates a plot showing an example impedance of a filter as a function of frequency.

FIGS. 16A and 16B illustrate plots showing an example impedance of filter 108 as a function of frequency, in accordance with some embodiments of the present invention. A magnitude of the impedance is shown in FIG. 16A and the impedances of the capacitive and inductive elements of filter 108 are shown in FIG. 16B. In the illustrated example, filter 108 is tuned to obtain a desired impedance response that includes an impedance that (1) is more inductive than capacitive in the lower frequency band (e.g., the impedance of the inductive element is less than the impedance of the capacitive element), (2) is more capacitive than inductive in the upper frequency band (e.g., the impedance of the capacitive element is less than the impedance of the inductive element), and (3) has a magnitude that is less than a maximum impedance threshold in both the lower and upper frequency bands.

Filter 108 may include one or more filter elements each comprising a parallel circuit including at least one capacitive element and at least one inductive element. The filter element may be tuned such that the resonant frequency is between the lower and upper frequency bands. In the illustrated example, the resonant frequency is set to the midpoint between the lower and upper frequency bands (e.g., 1400 MHz) so that the magnitude of the impedance drops below the maximum impedance threshold at the lower and upper bands. At or near the resonant frequency, when the impedance of filter 108 is significantly resistive and higher than the maximum impedance threshold, a significant portion of the electrical signals reflect from the filter boundary, resulting in a standing wave behavior on inner conductor 106, and hence very little radiation/reception and antenna gain.

FIG. 16B shows the variation of the impedances of the capacitive and inductive elements by frequency. The resonance occurs when these impedances are equal, resulting in a substantial resistance. At or near the resonant frequency, this substantial resistance causes significant reflections at filter 108, preventing antenna radiation and causing gain fluctuations. For proper antenna operation in the desired bands, the filter resonant frequency is to be placed in the middle of the two bands such that the impedance of filter 108 remains below the maximum impedance threshold and such that large reflections are avoided. In the lower frequency band, the impedance of the inductive element is much lower than the impedance of the capacitive element, causing the electrical signals, which choose the path of least resistance, to travel from the inner conductor to the outer conductor through the inductive element (e.g., the metal bridge connecting the inner conductor to the outer conductor). In the upper frequency band, the impedance of the capacitive element is much lower than the impedance of the inductive element, thus, the electrical signals travel through the capacitive element (e.g., the gap in between the inner and outer conductors). The high frequency signals can radiate through this gap before reaching the outer conductor.

As described above, since the current chooses the easiest path in the parallel circuit, the smaller impedance dominates the impedance of the parallel circuit. As such, the impedance of filter 108 is considered to be more inductive than capacitive at the lower frequency band (since the smaller inductive impedance dominates) and more capacitive than inductive at the upper frequency band (since the smaller capacitive impedance dominates).

Figure 17:
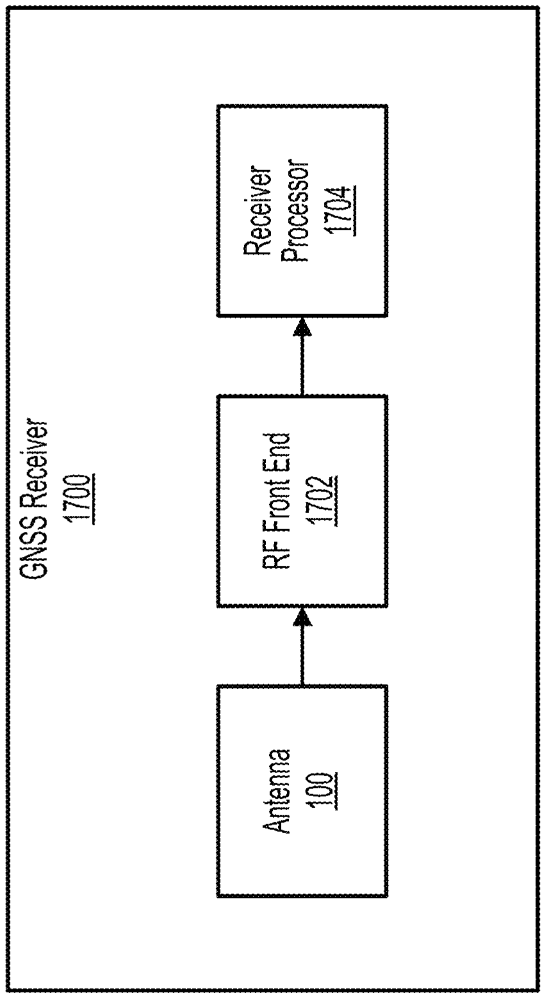
FIG. 17 illustrates an example block diagram of a GNSS receiver.

FIG. 17 illustrates an example block diagram of a GNSS receiver 1700, in accordance with some embodiments of the present invention. GNSS receiver 1700 includes antenna 100 for receiving wireless signals and sending/routing the wireless signals to an RF front end 1702. RF front ends are well known in the art, and in some instances include a band-pass filter for initially filtering out undesirable frequency components outside the frequencies of interest, a low-noise amplifier (LNA) for amplifying the received signal, a local oscillator and a mixer for down converting the received signal from RF to intermediate frequencies (IF), a band-pass filter for removing frequency components outside IF, and an analog-to-digital (A/D) converter for sampling the received signal to generate digital samples.

Digital samples generated by RF front end 1702 may be sent to a receiver processor 1704, which may process the digital samples to generate pseudoranges and/or position estimates corresponding to GNSS receiver 1700. In some instances, a correlator may be employed between RF front end 1702 and receiver processor 1704 that performs correlations on the digital samples using local codes. The correlator may generate correlation results based on the digital samples and send those results to receiver processor 1704. In some embodiments, the correlator is a specific piece of hardware, such as an application-specific integrated circuit (ASIC) or a field-programmable gate array (FPGA). In some embodiments, the operations performed by the correlator are performed in software using digital signal processing (DSP) techniques.

Based on multiple pseudoranges calculated using different received wireless signals from different GNSS satellites, receiver processor 1704 may generate and output position data comprising a plurality of GNSS points. Each of the plurality of GNSS points may be a 3D coordinate represented by three numbers. In some embodiments, the three numbers may correspond to latitude, longitude, and elevation/altitude. In other embodiments, the three numbers may correspond to X, Y, and Z positions. The position data may be outputted to be displayed to a user, transmitted to a separate device (e.g., computer, smartphone, server, etc.) via a wired or wireless connection, or further processed, among other possibilities.

Figure 18:
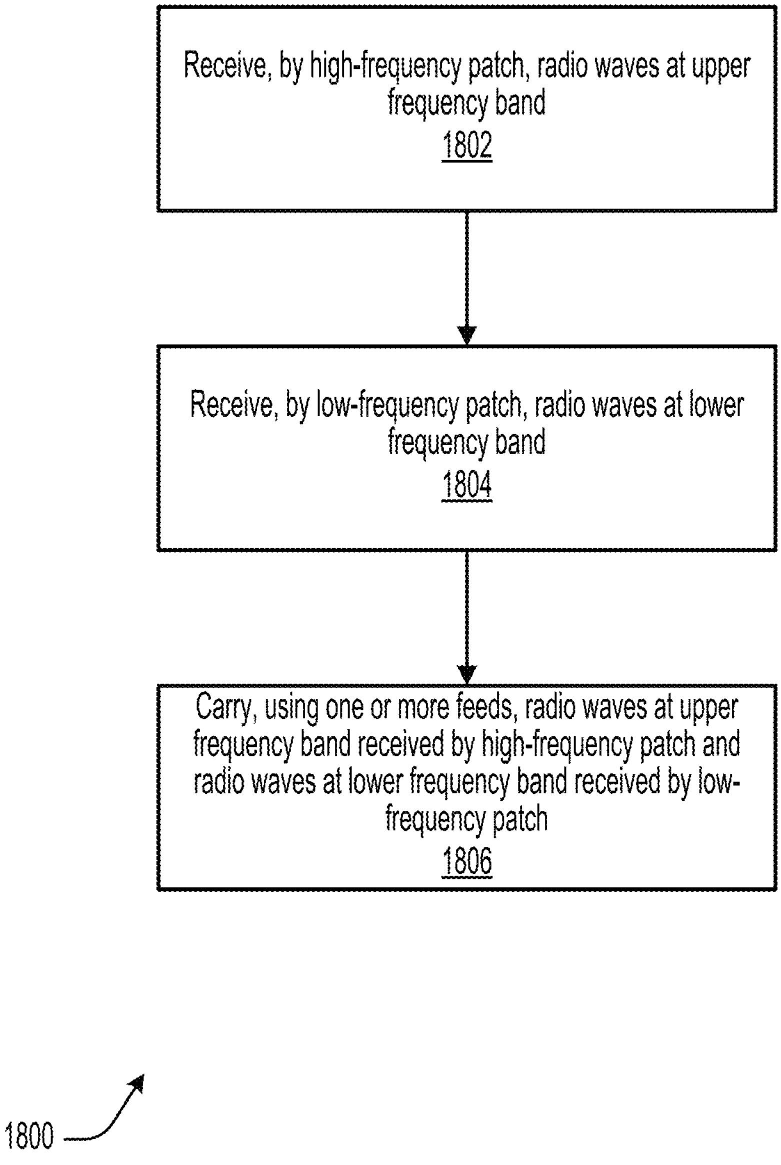
FIG. 18 illustrates an example method of receiving radio waves by an antenna.

FIG. 18 illustrates a method 1800 of receiving radio waves by an antenna (e.g., antenna 100), in accordance with some embodiments of the present invention. One or more steps of method 1800 may be omitted during performance of method 1800, and steps of method 1800 need not be performed in the order shown. In some instances, one or more steps of method 1800 may be facilitated by one or more processors. In some instances, method 1800 may be implemented as a computer-readable medium or computer program product comprising instructions which, when the program is executed by one or more computers, cause the one or more computers to carry out the steps of method 1800.

At step 1802, radio waves at an upper frequency band are received by a high-frequency patch (e.g., high-frequency patch 126) of the antenna. The high-frequency patch may be formed by an inner conductor (e.g., inner conductor 106) overlaying a dielectric layer (e.g., dielectric layer 102) and disposed above a ground plane (e.g., ground plane 116) of the antenna At step 1804, radio waves at a lower frequency band are received by a low-frequency patch (e.g., low-frequency patch 128) of the antenna. The low-frequency patch may be formed by the inner conductor and an outer conductor (e.g., outer conductor 104) overlaying the dielectric layer and surrounding the inner conductor. A filter (e.g., filter 108) may be disposed between the inner conductor and the outer conductor. The filter may at least partially block electrical signals at the upper frequency band and let pass electrical signals at the lower GNSS frequency band. The filter may include at least one capacitive element and at least one inductive element.

At step 1806, the radio waves at the upper frequency band received by the high-frequency patch and the radio waves at the lower frequency band received by the low-frequency patch are carried using one or more feeds (e.g., feeds 110) connected to the inner conductor. These received radio waves may be carried to an RF front end (e.g., RF front end 1702), which may generate digital samples that are sent to a processor (e.g., receiver processor 1704).

Figure 19:
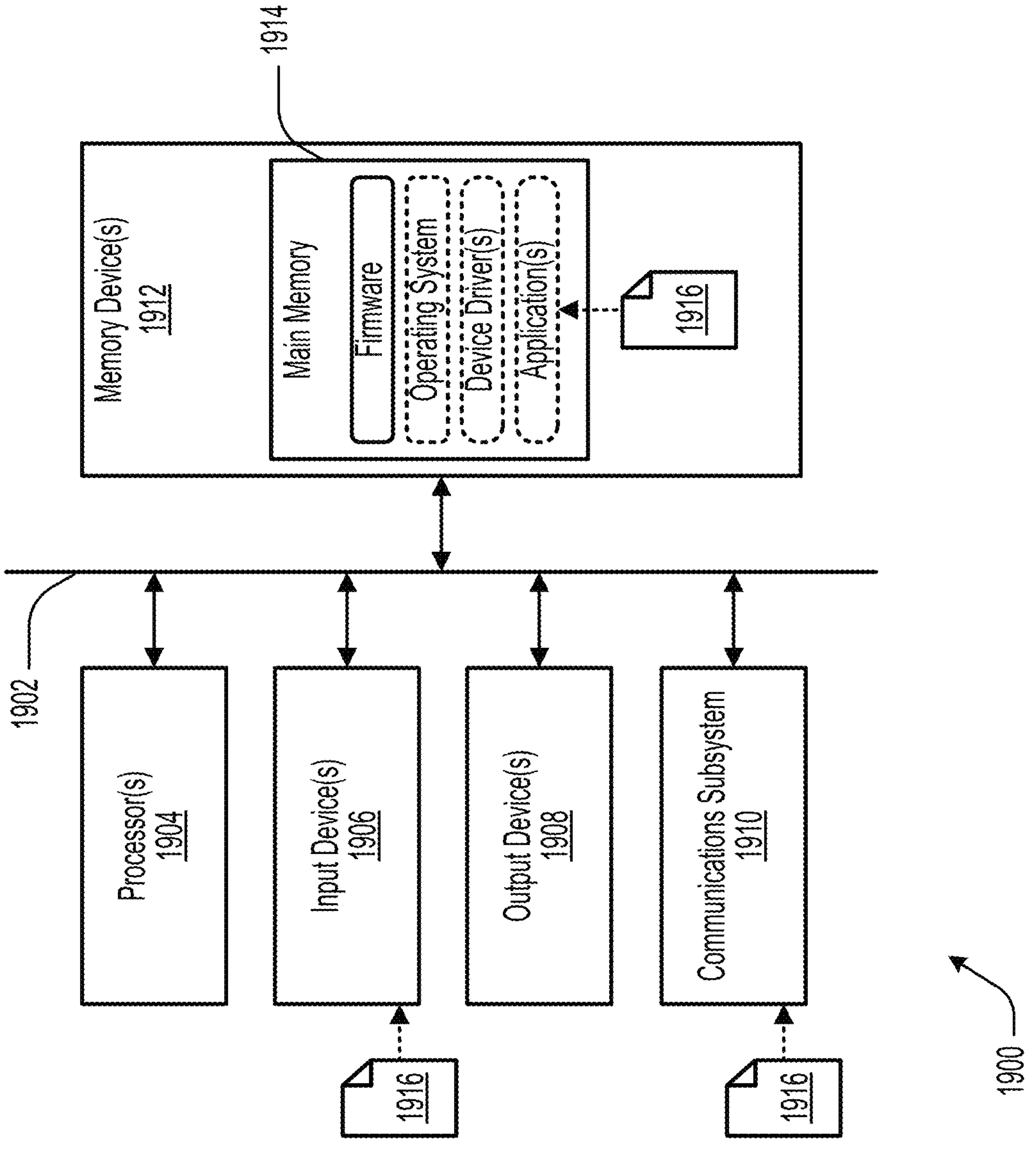
FIG. 19 illustrates an example computer system comprising various hardware elements.

FIG. 19 illustrates an example computer system 1900 comprising various hardware elements, according to some embodiments of the present disclosure. Computer system 1900 may be incorporated into or integrated with devices described herein and/or may be configured to perform some or all of the steps of the methods provided by various embodiments. For example, in various embodiments, computer system 1900 may be incorporated into receiver processor 1704 and/or may be configured to perform method 1800. It should be noted that FIG. 19 is meant only to provide a generalized illustration of various components, any or all of which may be utilized as appropriate. FIG. 19, therefore, broadly illustrates how individual system elements may be implemented in a relatively separated or relatively more integrated manner.

In the illustrated example, computer system 1900 includes a communication medium 1902, one or more processor(s) 1904, one or more input device(s) 1906, one or more output device(s) 1908, a communications subsystem 1910, and one or more memory device(s) 1912. Computer system 1900 may be implemented using various hardware implementations and embedded system technologies. For example, one or more elements of computer system 1900 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1900 may be coupled via communication medium 1902. While communication medium 1902 is illustrated as a single connection for purposes of clarity, it should be understood that communication medium 1902 may include various numbers and types of communication media for transferring data between hardware elements. For example, communication medium 1902 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1902 may include one or more buses connecting pins of the hardware elements of computer system 1900. For example, communication medium 1902 may include a bus connecting processor(s) 1904 with main memory 1914, referred to as a system bus, and a bus connecting main memory 1914 with input device(s) 1906 or output device(s) 1908, referred to as an expansion bus. The system bus may consist of several elements, including an address bus, a data bus, and a control bus. The address bus may carry a memory address from processor(s) 1904 to the address bus circuitry associated with main memory 1914 in order for the data bus to access and carry the data contained at the memory address back to processor(s) 1904. The control bus may carry commands from processor(s) 1904 and return status signals from main memory 1914. Each bus may include multiple wires for carrying multiple bits of information and each bus may support serial or parallel transmission of data.

Processor(s) 1904 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction.

Processor(s) 1904 may include one or more multi-core processors, in which each core may read and execute program instructions simultaneously with the other cores.

Input device(s) 1906 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1906 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1908 may include one or more of various devices that convert information into human-readable form, such as without limitation a display device, a speaker, a printer, and/or the like. Output device(s) 1908 may also include devices for writing to removable storage devices or other removable media, such as those described in reference to input device(s) 1906. Output device(s) 1908 may also include various actuators for causing physical movement of one or more components. Such actuators may be hydraulic, pneumatic, electric, and may be provided with control signals by computer system 1900.

Communications subsystem 1910 may include hardware components for connecting computer system 1900 to systems or devices that are located external computer system 1900, such as over a computer network. In various embodiments, communications subsystem 1910 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1912 may include the various data storage devices of computer system 1900. For example, memory device(s) 1912 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 1904 and memory device(s) 1912 are illustrated as being separate elements, it should be understood that processor(s) 1904 may include varying levels of on-processor memory, such as processor registers and caches that may be utilized by a single processor or shared between multiple processors.

Memory device(s) 1912 may include main memory 1914, which may be directly accessible by processor(s) 1904 via the memory bus of communication medium 1902. For example, processor(s) 1904 may continuously read and execute instructions stored in main memory 1914. As such, various software elements may be loaded into main memory 1914 to be read and executed by processor(s) 1904 as illustrated in FIG. 19. Typically, main memory 1914 is volatile memory, which loses all data when power is turned off and accordingly needs power to preserve stored data. Main memory 1914 may further include a small portion of non-volatile memory containing software (e.g., firmware, such as BIOS) that is used for reading other software stored in memory device(s) 1912 into main memory 1914. In some embodiments, the volatile memory of main memory 1914 is implemented as random-access memory (RAM), such as dynamic RAM (DRAM), and the non-volatile memory of main memory 1914 is implemented as read-only memory (ROM), such as flash memory, erasable programmable read-only memory (EPROM), or electrically erasable programmable read-only memory (EEPROM).

Computer system 1900 may include software elements, shown as being currently located within main memory 1914, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1916, executable by computer system 1900. In one example, such instructions 1916 may be received by computer system 1900 using communications subsystem 1910 (e.g., via a wireless or wired signal carrying instructions 1916), carried by communication medium 1902 to memory device(s) 1912, stored within memory device(s) 1912, read into main memory 1914, and executed by processor(s) 1904 to perform one or more steps of the described methods. In another example, instructions 1916 may be received by computer system 1900 using input device(s) 1906 (e.g., via a reader for removable media), carried by communication medium 1902 to memory device(s) 1912, stored within memory device(s) 1912, read into main memory 1914, and executed by processor(s) 1904 to perform one or more steps of the described methods.

In some embodiments of the present disclosure, instructions 1916 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 1900. For example, the non-transitory computer-readable medium may be one of memory device(s) 1912, as shown in FIG. 19, with instructions 1916 being stored within memory device(s) 1912. In some cases, the non-transitory computer-readable medium may be separate from computer system 1900. In one example, the non-transitory computer-readable medium may be a removable media provided to input device(s) 1906, such as those described in reference to input device(s) 1906, as shown in FIG. 19, with instructions 1916 being provided to input device(s) 1906. In another example, the non-transitory computer-readable medium may be a component of a remote electronic device, such as a mobile phone, that may wirelessly transmit a data signal carrying instructions 1916 to computer system 1900 using communications subsystem 1916, as shown in FIG. 19, with instructions 1916 being provided to communications subsystem 1910.

Instructions 1916 may take any suitable form to be read and/or executed by computer system 1900. For example, instructions 1916 may be source code (written in a human-readable programming language such as Java, C, C++, C#, Python), object code, assembly language, machine code, microcode, executable code, and/or the like. In one example, instructions 1916 are provided to computer system 1900 in the form of source code, and a compiler is used to translate instructions 1916 from source code to machine code, which may then be read into main memory 1914 for execution by processor(s) 1904. As another example, instructions 1916 are provided to computer system 1900 in the form of an executable file with machine code that may immediately be read into main memory 1914 for execution by processor(s) 1904. In various examples, instructions 1916 may be provided to computer system 1900 in encrypted or unencrypted form, compressed or uncompressed form, as an installation package or an initialization for a broader software deployment, among other possibilities.

In one aspect of the present disclosure, a system (e.g., computer system 1900) is provided to perform methods in accordance with various embodiments of the present disclosure. For example, some embodiments may include a system comprising one or more processors (e.g., processor(s) 1904) that are communicatively coupled to a non-transitory computer-readable medium (e.g., memory device(s) 1912 or main memory 1914). The non-transitory computer-readable medium may have instructions (e.g., instructions 1916) stored therein that, when executed by the one or more processors, cause the one or more processors to perform the methods described in the various embodiments.

In another aspect of the present disclosure, a computer-program product that includes instructions (e.g., instructions 1916) is provided to perform methods in accordance with various embodiments of the present disclosure. The computer-program product may be tangibly embodied in a non-transitory computer-readable medium (e.g., memory device(s) 1912 or main memory 1914). The instructions may be configured to cause one or more processors (e.g., processor(s) 1904) to perform the methods described in the various embodiments.

In another aspect of the present disclosure, a non-transitory computer-readable medium (e.g., memory device(s) 1912 or main memory 1914) is provided. The non-transitory computer-readable medium may have instructions (e.g., instructions 1916) stored therein that, when executed by one or more processors (e.g., processor(s) 1904), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms “a”, “an”, and “the” include plural references unless the context clearly dictates otherwise. Thus, for example, reference to “a user” includes reference to one or more of such users, and reference to “a processor” includes reference to one or more processors and equivalents thereof known to those skilled in the art, and so forth.

Also, the words “comprise,” “comprising,” “contains,” “containing,” “include,” “including,” and “includes,” when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An antenna configured to receive radio waves at global navigation satellite system (GNSS) frequencies, the antenna comprising:

a ground plane;

an inner conductor disposed above the ground plane, the inner conductor forming a high-frequency patch for receiving radio waves at an upper GNSS frequency band;

an outer conductor surrounding the inner conductor, the outer conductor and the inner conductor collectively forming a low-frequency patch for receiving radio waves at a lower GNSS frequency band;

a filter disposed between the inner conductor and the outer conductor, the filter including at least one capacitive element formed by spacing portions of the inner conductor and the outer conductor at a particular distance apart from each other and over a particular length of the filter, the filter being configured to at least partially block electrical signals at the upper GNSS frequency band and to let pass electrical signals at the lower GNSS frequency band; and a plurality of feeds connected to the inner conductor for carrying the radio waves at the upper GNSS frequency band received by the high-frequency patch and the radio waves at the lower GNSS frequency band received by the low-frequency patch, the plurality of feeds being disposed around a center of the inner conductor and being spaced by equal angular intervals around the center of the inner conductor, wherein the plurality of feeds include a first feed in direct contact with the inner conductor, a second feed spaced from the first feed by an angular interval and in direct contact with the inner conductor, a third feed spaced from the second feed by the angular interval and in direct contact with the inner conductor, and a fourth feed spaced from the third feed by the angular interval and in direct contact with the inner conductor, and wherein each of the plurality of feeds separately pass through the ground plane.

2. The antenna of claim 1, further comprising a dielectric layer sandwiched between the ground plane and the inner conductor.

3. The antenna of claim 2, wherein the plurality of feeds extend through the dielectric layer and are connected to the inner conductor at a bottom side of the inner conductor.

4. The antenna of claim 1, wherein a magnitude of an impedance of the filter is greater between the lower GNSS frequency band and the upper GNSS frequency band than the magnitude of the impedance of the filter at each of the lower GNSS frequency band and the upper GNSS frequency band.

5. The antenna of claim 4, wherein the magnitude of the impedance of the filter is less than a maximum impedance threshold at each of the lower GNSS frequency band and the upper GNSS frequency band.

6. The antenna of claim 1, wherein an impedance of the filter is more inductive than capacitive at the lower GNSS frequency band and more capacitive than inductive at the upper GNSS frequency band.

7. The antenna of claim 1, wherein the filter further includes at least one inductive element.

8. The antenna of claim 7, wherein the at least one capacitive element and the at least one inductive element are arranged in a parallel circuit.

9. The antenna of claim 8, wherein the parallel circuit has a resonant frequency that is determined by a capacitance value of the at least one capacitive element and an inductance value of the at least one inductive element, and wherein the capacitance value and the inductance value are selected such that the resonant frequency of the parallel circuit is between the lower GNSS frequency band and the upper GNSS frequency band.

10. The antenna of claim 1, wherein each of the inner conductor and the outer conductor is circular.

11. The antenna of claim 1, wherein each of the inner conductor and the outer conductor is rectangular.

12. The antenna of claim 1, wherein the inner conductor and the outer conductor are coplanar.

13. An antenna, comprising: a ground plane; an inner conductor disposed above the ground plane, the inner conductor forming a high-frequency patch for receiving radio waves at an upper frequency band; an outer conductor surrounding the inner conductor, the outer conductor and the inner conductor collectively forming a low-frequency patch for receiving radio waves at a lower frequency band; a filter disposed between the inner conductor and the outer conductor, the filter including at least one capacitive element and at least one inductive element, the at least one capacitive element formed by spacing portions of the inner conductor and the outer conductor at a particular distance apart from each other and over a particular length of the filter; and a plurality of feeds connected to the inner conductor for carrying electrical signals received by the high-frequency patch and electrical signals received by the low-frequency patch, the plurality of feeds being disposed around a center of the inner conductor and being spaced by equal angular intervals around the center of the inner conductor, wherein the plurality of feeds include a first feed in direct contact with the inner conductor, a second feed spaced from the first feed by an angular interval and in direct contact with the inner conductor, a third feed spaced from the second feed by the angular interval and in direct contact with the inner conductor, and a fourth feed spaced from the third feed by the angular interval and in direct contact with the inner conductor, and wherein each of the plurality of feeds separately pass through the ground plane.

14. The antenna of claim 13, further comprising a dielectric layer sandwiched between the ground plane and the inner conductor.

15. The antenna of claim 14, wherein the plurality of feeds extend through the dielectric layer and are connected to the inner conductor at a bottom side of the inner conductor.

16. The antenna of claim 13, wherein a magnitude of an impedance of the filter is greater between the lower frequency band and the upper frequency band than the magnitude of the impedance of the filter at each of the lower frequency band and the upper frequency band.

17. The antenna of claim 13, wherein the at least one capacitive element and the at least one inductive element are arranged in a parallel circuit.

18. The antenna of claim 17, wherein the parallel circuit has a resonant frequency that is determined by a capacitance value of the at least one capacitive element and an inductance value of the at least one inductive element, and wherein the capacitance value and the inductance value are selected such that the resonant frequency of the parallel circuit is between the lower frequency band and the upper frequency band.

19. The antenna of claim 13, wherein the inner conductor and the outer conductor are coplanar.

20. A method of receiving radio waves by an antenna, the method comprising:

receiving, by a high-frequency patch of the antenna, radio waves at an upper frequency band, wherein the high-frequency patch is formed by an inner conductor;

receiving, by a low-frequency patch of the antenna, radio waves at a lower frequency band, wherein the low-frequency patch is formed by the inner conductor and an outer conductor surrounding the inner conductor, wherein a filter is disposed between the inner conductor and the outer conductor, the filter including at least one capacitive element formed by spacing portions of the inner conductor and the outer conductor at a particular distance apart from each other and over a particular length of the filter, the filter being configured to at least partially block electrical signals at the upper frequency band and to let pass electrical signals at the lower frequency band; and carrying, using a plurality of feeds connected to the inner conductor, the radio waves at the upper frequency band received by the high-frequency patch and the radio waves at the lower frequency band received by the low-frequency patch, the plurality of feeds being disposed around a center of the inner conductor and being spaced by equal angular intervals around the center of the inner conductor, wherein the plurality of feeds include a first feed in direct contact with the inner conductor, a second feed spaced from the first feed by an angular interval and in direct contact with the inner conductor, a third feed spaced from the second feed by the angular interval and in direct contact with the inner conductor, and a fourth feed spaced from the third feed by the angular interval and in direct contact with the inner conductor, and wherein each of the plurality of feeds separately pass through a ground plane.

* * * * *